(12) United States Patent
Lim et al.

(10) Patent No.: US 12,556,705 B2
(45) Date of Patent: *Feb. 17, 2026

(54) IMAGE ENCODING/DECODING METHOD AND DEVICE, AND RECORDING MEDIUM STORING BITSTREAM

(71) Applicant: ELECTRONICS AND TELECOMMUNICATIONS RESEARCH INSTITUTE, Daejeon (KR)

(72) Inventors: Sung Chang Lim, Daejeon (KR); Hyun Suk Ko, Daejeon (KR); Jung Won Kang, Daejeon (KR); Jin Ho Lee, Daejeon (KR); Ha Hyun Lee, Seoul (KR); Dong San Jun, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 20 days.

This patent is subject to a terminal disclaimer.

(21) Appl. No.: 18/472,473

(22) Filed: Sep. 22, 2023

(65) Prior Publication Data

US 2024/0015293 A1 Jan. 11, 2024

Related U.S. Application Data

(63) Continuation of application No. 16/634,922, filed as application No. PCT/KR2018/008714 on Jul. 31, 2018, now Pat. No. 11,805,256.

(30) Foreign Application Priority Data

Jul. 31, 2017 (KR) .................. 10-2017-0096656

(51) Int. Cl.
*H04N 19/129* (2014.01)
*H04N 19/176* (2014.01)
(Continued)

(52) U.S. Cl.
CPC ......... *H04N 19/129* (2014.11); *H04N 19/176* (2014.11); *H04N 19/186* (2014.11); *H04N 19/64* (2014.11)

(58) Field of Classification Search
CPC .... H04N 19/176; H04N 19/12; H04N 19/157; H04N 19/129; H04N 19/119
See application file for complete search history.

(56) References Cited

U.S. PATENT DOCUMENTS 9,300,972 B2 3/2016 Cheon et al.
9,756,360 B2 9/2017 Joshi et al.
(Continued)

FOREIGN PATENT DOCUMENTS

CN 102388610 A 3/2012
JP 2014-525200 A 9/2014
(Continued)

OTHER PUBLICATIONS

Yue Yu et al., "Adaptive Scan for Large Blocks for HEVC," Joint Collaborative Team on Video Coding (JCT-VC) of ITU-T SG16 WP3 and ISO/IEC JTC1/SC29/WG11, JCTVC-F569_r2, 6th Meeting: Torino, IT, Jul. 14-22, 2011, pp. 1-7.
(Continued)

*Primary Examiner* — Daniel Chang
(74) *Attorney, Agent, or Firm* — NSIP Law

(57) ABSTRACT

The present invention relates to an image encoding and decoding method. An image decoding method for the same may include: obtaining transform coefficients of a current block from a bitstream; determining a scanning unit and a scanning order of the current block; and rearranging the transform coefficients of the current block by scanning the same base on the determined scanning unit and scanning order.

14 Claims, 14 Drawing Sheets

(51) Int. Cl.
*H04N 19/186* (2014.01)
*H04N 19/64* (2014.01)

(56) References Cited

U.S. PATENT DOCUMENTS

| | | | |
|---|---|---|---|
| 10,873,761 B2 | 12/2020 | Kolesnikov | |
| 2011/0310973 A1* | 12/2011 | Cheon | H04N 19/18 375/240.18 |
| 2012/0140822 A1* | 6/2012 | Wang | H04N 19/197 375/240.18 |
| 2012/0170649 A1* | 7/2012 | Chen | H04N 19/159 375/240.18 |
| 2013/0003834 A1 | 1/2013 | Rojals et al. | |
| 2013/0051475 A1* | 2/2013 | Joshi | H04N 19/159 375/240.18 |
| 2013/0058407 A1* | 3/2013 | Sole Rojals | H04N 19/184 375/240.18 |
| 2013/0064294 A1* | 3/2013 | Sole Rojals | H04N 19/129 375/240.18 |
| 2013/0083857 A1* | 4/2013 | Zheng | H04N 19/176 375/240.18 |
| 2013/0114692 A1 | 5/2013 | Sze et al. | |
| 2013/0114730 A1* | 5/2013 | Joshi | H04N 19/156 375/240.18 |
| 2013/0266068 A1 | 10/2013 | Seo et al. | |
| 2013/0272379 A1 | 10/2013 | Sole Rojals et al. | |
| 2013/0272414 A1* | 10/2013 | Sole Rojals | H04N 19/14 375/240.16 |
| 2013/0272424 A1* | 10/2013 | Sole Rojals | H04N 19/61 375/240.18 |
| 2013/0301705 A1* | 11/2013 | Seregin | H04N 19/18 375/240.02 |
| 2013/0343452 A1 | 12/2013 | Jeong et al. | |
| 2014/0003530 A1* | 1/2014 | Sole Rojals | H04N 19/61 375/240.18 |
| 2014/0056362 A1 | 2/2014 | Mrak et al. | |
| 2014/0086307 A1* | 3/2014 | Karczewicz | H04N 19/18 375/240.02 |
| 2014/0105283 A1* | 4/2014 | Li | H04N 19/126 375/240.03 |
| 2014/0269915 A1* | 9/2014 | Lee | H04N 19/86 375/240.18 |
| 2014/0307784 A1 | 10/2014 | Lee et al. | |
| 2014/0362917 A1* | 12/2014 | Joshi | H04N 19/44 375/240.12 |
| 2015/0063446 A1* | 3/2015 | Sugio | H04N 19/129 375/240.03 |
| 2015/0063460 A1* | 3/2015 | Gamei | H04N 19/593 375/240.18 |
| 2015/0071359 A1* | 3/2015 | Guo | H04N 19/91 375/240.18 |
| 2015/0110180 A1* | 4/2015 | An | H04N 19/12 375/240.12 |
| 2015/0172658 A1* | 6/2015 | Kim | H04N 19/61 |
| 2015/0281706 A1* | 10/2015 | Ström | H04N 19/547 375/240.02 |
| 2015/0312571 A1* | 10/2015 | Kim | H04N 19/187 375/240.03 |
| 2016/0286232 A1* | 9/2016 | Li | H04N 19/513 |
| 2017/0094313 A1* | 3/2017 | Zhao | H04N 1/32181 |
| 2019/0068989 A1* | 2/2019 | Lee | H04N 19/176 |
| 2019/0082179 A1* | 3/2019 | Ahn | H04N 19/136 |
| 2019/0089961 A1* | 3/2019 | Ahn | H04N 19/157 |
| 2019/0158827 A1* | 5/2019 | Sim | H04N 19/11 |
| 2019/0387241 A1* | 12/2019 | Kim | H04N 19/625 |
| 2020/0404332 A1* | 12/2020 | Sarwer | H04N 19/91 |

FOREIGN PATENT DOCUMENTS

| | | |
|---|---|---|
| JP | 2015-516745 A | 6/2015 |
| KR | 10-0772576 B1 | 11/2007 |
| KR | 10-2012-0140366 A | 12/2012 |
| KR | 10-1443172 B1 | 9/2014 |
| KR | 10-1590243 B1 | 1/2016 |
| KR | 10-2016-0052789 A | 5/2016 |
| KR | 10-1640973 B1 | 7/2016 |
| KR | 10-1672456 B1 | 11/2016 |
| KR | 10-1672607 B1 | 11/2016 |
| WO | WO 2017/155334 A1 | 9/2017 |
| WO | WO 2017/195476 A1 | 11/2017 |

OTHER PUBLICATIONS

Masato Shima., "Removal of zigzag scan from quantization matrices coding," Joint Collaborative Team on Video Coding (JCT-VC) of ITU-T SG 16 WP3 and ISO/IEC JTC 1/SC 29/WG11, 9$^{th}$ Meeting, Apr. 27-May 7, 2012. pp 1-10.

Cheung, Auyeung, "Additional Horizontal And Vertical Scan For Transform Coefficients", JCTVC-J0281, Joint Collaborative Team on Video Coding (JCT-VC) of ITU-T SG 16 WP 3 and ISO/IEC JTC 1/SC 29/WG 11, 10th Meeting: Stockholm, Jul. 2012, (pp. 1-16).

Jianle Chen et al., "Algorithm Description of Joint Exploration Test Model 2" Joint Video Exploration Team (JVET) of ITU-T SG 16 WP 3 and ISO/IEC JTC 1/SC 29/WG 11, 2$^{nd}$ Meeting, Feb. 2016, pp. 1-8.

International Search Report conducted on Oct. 31, 2018 in Corresponding International Patent Application No. PCT/KR2018/008714 (3 pages in Korean, 3 pages in English).

* cited by examiner

FIG. 4

| Intra Prediction Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertical direction transform set | 2 | 1 | 0 | 1 | 0 | 1 | 0 | 1 | 0 | 1 | 0 | 1 | 0 | 1 | 0 | 0 | 0 | 0 |
| horizontal direction transform set | 2 | 1 | 0 | 1 | 0 | 1 | 0 | 1 | 0 | 1 | 0 | 1 | 0 | 1 | 2 | 2 | 2 | 2 |
| Intra Prediction Mode | 18 | 19 | 20 | 21 | 22 | 23 | 24 | 25 | 26 | 27 | 28 | 29 | 30 | 31 | 32 | 33 | 34 | |
| vertical direction transform set | 0 | 0 | 0 | 0 | 0 | 1 | 0 | 1 | 0 | 1 | 0 | 1 | 0 | 1 | 0 | 1 | 0 | |
| horizontal direction transform set | 2 | 2 | 2 | 2 | 2 | 1 | 0 | 1 | 0 | 1 | 0 | 1 | 0 | 1 | 0 | 1 | 0 | |
| Intra Prediction Mode | 35 | 36 | 37 | 38 | 39 | 40 | 41 | 42 | 43 | 44 | 45 | 46 | 47 | 48 | 49 | 50 | 51 | 52 |
| vertical direction transform set | 1 | 0 | 1 | 0 | 1 | 0 | 1 | 0 | 1 | 0 | 1 | 2 | 2 | 2 | 2 | 2 | 2 | 2 |
| horizontal direction transform set | 1 | 0 | 1 | 0 | 1 | 0 | 1 | 0 | 1 | 0 | 1 | 0 | 0 | 0 | 0 | 0 | 0 | 0 |
| Intra Prediction Mode | 53 | 54 | 55 | 56 | 57 | 58 | 59 | 60 | 61 | 62 | 63 | 64 | 65 | 66 | | | | |
| vertical direction transform set | 2 | 2 | 1 | 0 | 1 | 0 | 1 | 0 | 1 | 0 | 1 | 0 | 1 | 0 | | | | |
| horizontal direction transform set | 0 | 0 | 1 | 0 | 1 | 0 | 1 | 0 | 1 | 0 | 1 | 0 | 1 | 0 | | | | |

FIG. 5

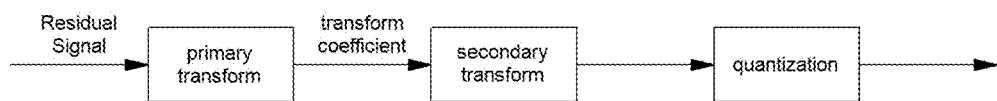

IMAGE ENCODING/DECODING METHOD AND DEVICE, AND RECORDING MEDIUM STORING BITSTREAM

CROSS REFERENCE TO RELATED APPLICATIONS

This application is a Continuation Application of U.S. patent application Ser. No. 16/634,922 filed on Jan. 29, 2020, which is a U.S. National Stage Application of International Application No. PCT/KR2018/008714, filed on Jul. 31, 2018, which claims the benefit under 35 USC 119(a) and 365(b) of Korean Patent Application No. 10-2017-0096656, filed on Jul. 31, 2017 in the Korean Intellectual Property Office, the entire disclosure of which is incorporated herein by reference for all purposes.

TECHNICAL FIELD

The present invention relates to an image encoding/decoding method and apparatus, and a recording medium storing a bitstream. More particularly, the present invention relates to an image encoding/decoding method and apparatus being capable of adaptively determining a scanning method of transform coefficients.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

A conventional image encoding/decoding method and apparatus is limited in coding efficiency since scanning of transform coefficients is performed regardless of whether or not primary transform and secondary transform are performed.

DETAILED DESCRIPTION OF THE INVENTION

Technical Problem

The present invention is to provide a method and apparatus for performing scanning of transform coefficients according to whether or not at least one of primary transform and secondary transform is performed to improve image encoding/decoding efficiency.

The present invention is to provide an image decoding/encoding method and apparatus being capable of adaptively determining a scanning method of transform coefficients to improve image encoding/decoding efficiency.

Technical Solution

A method of decoding an image according to the present invention, the method may comprise obtaining transform coefficients of a current block from a bitstream, determining a scanning unit and a scanning order of the current block and arranging the transform coefficients of the current block by scanning the same based on the determined scanning unit and scanning order.

In the method of decoding an image according to the present invention, wherein the transform coefficients of the current block are any one of an input of dequantization, an input of secondary inverse transform, and an input of primary inverse transform.

In the method of decoding an image according to the present invention, wherein the scanning order include at least one of a vertical scanning order, a horizontal scanning order, a first vertical precedence scanning order preferentially scanning a first column than other columns, a second vertical precedence scanning order preferentially scanning a first column and a second column than other columns, a first horizontal precedence scanning order preferentially scanning a first row than other rows, a second horizontal precedence scanning order preferentially scanning a first row and a second row than other rows, an up-right diagonal scanning order, and a down-left diagonal scanning order.

In the method of decoding an image according to the present invention, wherein the scanning unit is determined as any one of a coefficient group unit, an individual coefficient unit, and a combination unit.

In the method of decoding an image according to the present invention, wherein in the determining of the scanning unit and the scanning order of the current block, the scanning unit and the scanning order of the current block are determined based on at least one of a scanning unit and a scanning order of a neighbor block of the current block.

In the method of decoding an image according to the present invention, wherein when the scanning unit of the current block is determined as a coefficient group unit, a transform coefficient scanning order within the coefficient group unit is determined based on a scanning order of a neighbor coefficient group adjacent to the current coefficient group.

In the method of decoding an image according to the present invention, wherein the scanning order of the current block is determined based on a depth of the current block.

In the method of decoding an image according to the present invention, wherein a scanning unit and a scanning order of a chroma component of the current block are determined based on a scanning unit and a scanning order of a luma component of the current block.

In the method of decoding an image according to the present invention, wherein a scanning order of a quantization matrix of the current block is derived based on the determined scanning order.

In the method of decoding an image according to the present invention, further comprising performing at least one of dequantization, secondary inverse transform, and primary inverse transform for the arranged transform coefficients.

A method of encoding an image according to the present invention, the method may comprise obtaining transform coefficients of a current block from a residual block of the current block, determining a scanning unit and a scanning order of the current block and entropy encoding the transform coefficients of the current block by scanning the same in the determined scanning unit and scanning order.

In the method of encoding an image according to the present invention, wherein the transform coefficients of the current block are any one an output of primary transform, an output of secondary transform, and an output of quantization.

In the method of encoding an image according to the present invention, wherein the scanning order includes at least one of a vertical scanning order, a horizontal scanning order, a first vertical precedence scanning order preferentially scanning a first column than other columns, a second vertical precedence scanning order preferentially scanning a first column and a second column than other columns, a first horizontal precedence scanning order preferentially scanning a first row than other rows, a second horizontal precedence scanning order preferentially scanning a first row and a second row than other rows, a up-right diagonal scanning order, and a down-left diagonal scanning order.

In the method of encoding an image according to the present invention, wherein the scanning unit is determined as any one of a coefficient group unit, an individual coefficient unit, and a combination unit.

In the method of encoding an image according to the present invention, wherein in the determining of the scanning unit and the scanning order of the current block, the scanning unit and the scanning order of the current block are determined based on at least one of a scanning unit and a scanning order of a neighbor block of the current block.

In the method of encoding an image according to the present invention, wherein when the scanning unit of the current block is determined as a coefficient group unit, a transform coefficient scanning order within the coefficient group unit is determined based on a scanning order of a neighbor coefficient group adjacent to the current coefficient group.

In the method of encoding an image according to the present invention, wherein the scanning order of the current block is determined based on a depth of the current block.

In the method of encoding an image according to the present invention, wherein a scanning unit and a scanning order of a chroma component of the current block are determined based on a scanning unit and a scanning order of a luma component of the current block.

In the method of encoding an image according to the present invention, wherein a scanning order of a quantization matrix of the current block is derived based on the determined scanning order.

A recording medium storing a bitstream generated by an encoding method comprising: obtaining transform coefficients of a current block from a residual block of the current block, determining a scanning unit and a scanning order of the current block; and entropy encoding the transform coefficients of the current block by scanning the same in the determined scanning unit and scanning order.

Advantageous Effects

According to the present invention, in order to improve image encoding/decoding efficiency, there is provided a method and apparatus for performing scanning of transform coefficients according to whether or not at least one of primary transform and secondary transform is performed.

According to the present invention, there is provided an image encoding/decoding method and apparatus being capable of adaptively determining a scanning method of transform coefficients.

According to the present invention, image encoding and decoding efficiency can be improved.

According to the present invention, calculation complexity of image encoder and decoder can be reduced.

DESCRIPTION OF DRAWINGS

FIG. 4 is a view showing a transform set according to an intra-prediction mode.

FIG. 5 is a view showing a process of transform and quantization.

MODE FOR INVENTION

Figure 1:
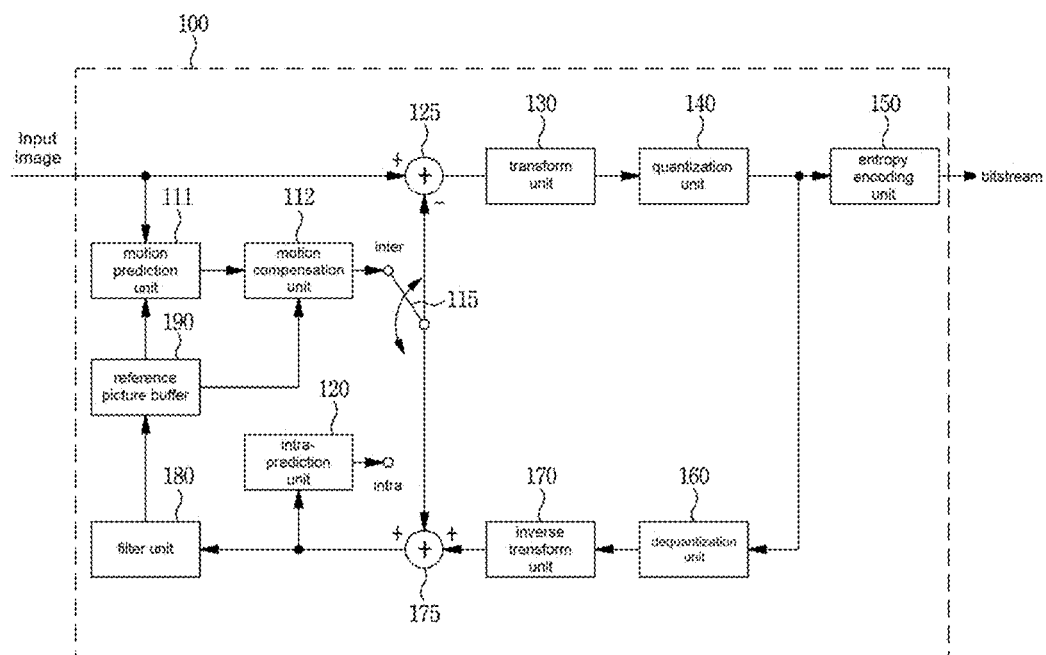
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator: may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag: indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index: may refer to an index indicating a specific reference picture in a reference picture list.

Reference picture: may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector: may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range: may be a two-dimensional region which is searched to retrieve a motion vector during inter prediction. For example, the size of the search range may be M×N. Here, M and N are both integers.

Motion vector candidate: may refer to a prediction candidate block or a motion vector of the prediction candidate block when predicting a motion vector. In addition, a motion vector candidate may be included in a motion vector candidate list.

Motion vector candidate list: may mean a list composed of one or more motion vector candidates.

Motion vector candidate index: may mean an indicator indicating a motion vector candidate in a motion vector candidate list. Alternatively, it may be an index of a motion vector predictor.

Motion information: may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list: may mean a list composed of one or more merge candidates.

Merge candidate: may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index: may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
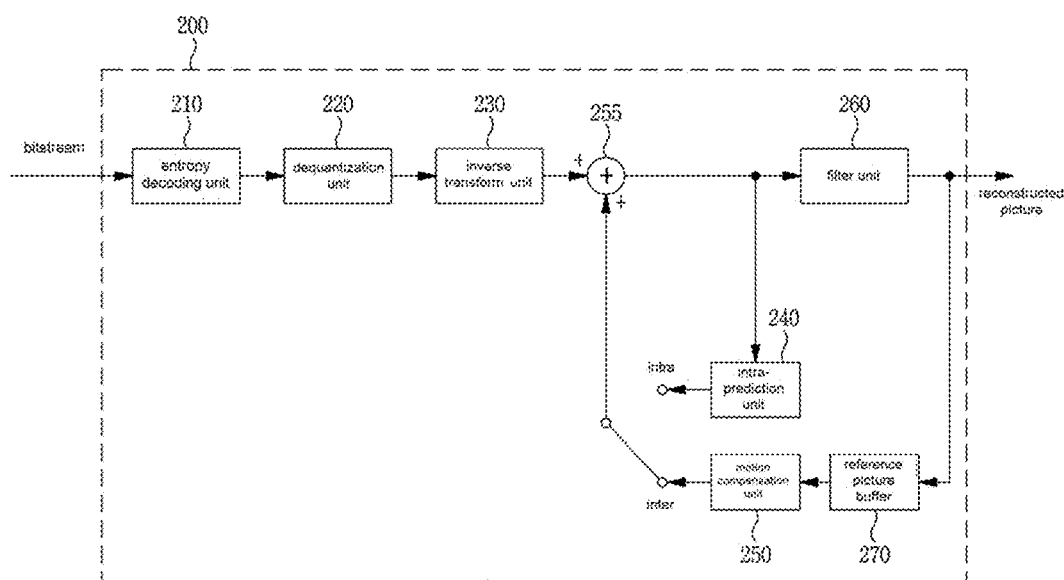
FIG. 2 is a block diagram showing configurations of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image.

The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
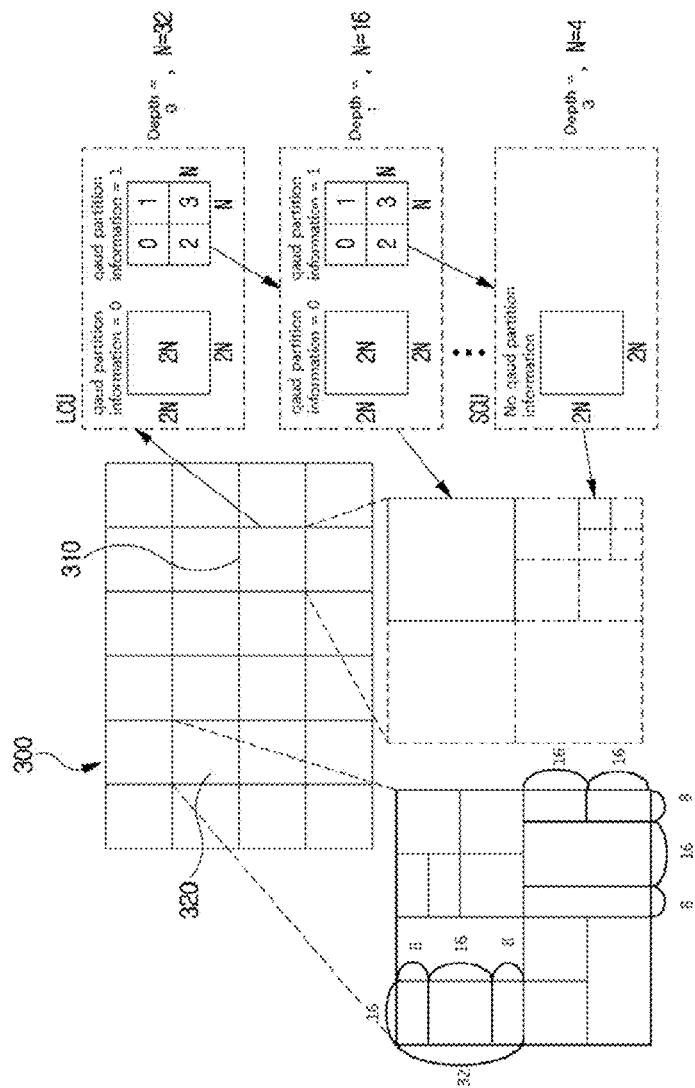
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction information, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Based on the above description, an image encoding/decoding method according to the present invention will be described in detail.

In below, a process of transform and quantization according to the present invention will be described.

A quantized level may be generated by performing transform or quantization or both for a residual signal generated after intra or inter prediction. The residual signal may be generated by a difference between an original block and a prediction block (intra-prediction block or inter-prediction block). Herein, the prediction block may be a block generated by intra-prediction or inter-prediction. In addition, the prediction block may be a block generated by at least one of intra-prediction and inter-prediction or by at least one combination thereof. Herein, transform may include at least one of primary transform and secondary transform. When primary transform is performed for the residual signal, transform coefficients may be generated, and when secondary transform is performed for the transform coefficients, secondary transform coefficients may be generated.

Meanwhile, a residual signal may be transformed to a frequency domain by performing a transform process as a quantization process. Herein, when performing primary transform, various DCT types, in addition to a DCT type 2 (DCT-II), and DST kernels may be used. For such transform kernels, transform may be performed by using separable transform respectively performing one-dimensional transform (1D transform) for the residual signal in horizontal or vertical or both directions, or by using two-dimensional non-separable transform (2D non-separable transform).

In one embodiment, as DCT and DST types used for transform, in addition to DCT-II, at least one of DCT based transform and DST based transform such as DCT-V, DCT-VIII, DST-I, DST-VII, etc. may be adaptively used when performing 1D transform as shown in the table below. For example, a DCT or DST type used for transform may be derived by configuring a transform set as shown in examples of Tables 1 and 2.

TABLE 1

| Transform set | Transform |
|---|---|
| 0 | DST_VII, DCT-VIII |
| 1 | DST-VII, DST-I |
| 2 | DST-VII, DCT-V |

TABLE 2

| Transform set | Transform |
|---|---|
| 0 | DST_VII, DCT-VIII, DST-I |
| 1 | DST-VII, DST-I, DCT-VIII |
| 2 | DST-VII, DCT-V, DST-I |

For example, as shown in FIG. 4, after defining transform sets different from each other for a horizontal or vertical direction according to an intra-prediction mode, transform or inverse transform or both may be performed in an encoder/decoder by using an intra-prediction mode of a current block to be encoded/decoded and transform included in a transform set.

Herein, a transform set may be defined according to the same rule in the encoder/decoder rather than entropy encoded/decoded. Herein, information indicating which transform is used among transforms included in a corresponding transform set may be entropy encoded/decoded.

For example, when a block size is equal to or lower than 32×32, three types of transform sets may be configured according to an intra-prediction mode as shown in an example of Table 2, and transform is performed in nine multiple transform types by combining respective three transforms as horizontal directional transform and vertical directional transform. Thus, coding efficiency may be improved by encoding/decoding a residual signal by using the optimized transform type. Herein, in order to entropy encode/decode information representing which transform among tree transforms included in one transform set is used, truncated unary binarization may be used. Herein, information indicating which transform among transforms includes in a transform set is used for at least one of vertical transform and horizontal transform may be entropy encoded/decoded.

In the encoder, after completing primary transform described above, secondary transform may be performed as shown in an example of FIG. 5 to improve energy concentration of transform coefficients. The secondary transform may be performed by using separate transform that respectively performs one-dimensional transform for horizontal or vertical or both directions, or by using a two-dimensional non-separable transform. Information indicating the used transform may be signaled or implicitly derived in the encoder/decoder according to coding information of a current or neighbor block. For example, as primary transform, a transform set for secondary transform may be defined, and the transform set may be defined according to the same rule in the encoder/decoder rather than being entropy encoded/decoded. Herein, information indicating which transform among transforms included in a corresponding transform set may be signaled, or may be applied to at least one residual signal generated through intra or inter prediction.

A least one of a number and types of transform candidates by transform set may be different, and at least one of the number and types of transform candidates may be variably determined in consideration of at least one of a position, a size, a form, a prediction mode (intra/inter mode) of a block (CU, PU, TU, etc.), and whether or not an intra-prediction mode is directional or non-directional.

In the decoder, secondary inverse transform may be performed according to whether or not to perform secondary inverse transform, primary inverse transform may be performed for a result of secondary inverse transform according to whether or not to perform primary inverse transform.

Primary transform and secondary transform described above may be applied to at least one signal component of luma/chroma components, or may be applied according to a size/form of an arbitrary coding block. An index indicating whether or not primary transform/secondary transform are used in an arbitrary coding block, and used primary transform/secondary transform may be entropy encoded/decoded, or may be implicitly derived in the encoder/decoder according to at least one of current/neighbor coding information.

A quantized level may be generated by performing quantization for a result obtained by performing primary transform or secondary transform or both or for a residual signal.

The quantized level may be scanned according to at least one of up-right diagonal scanning, vertical scanning, and horizontal scanning based on an intra-prediction mode or at least one of block size/form. For example, changing to a one-dimensional vector or array form may be available by scanning coefficients of a block by using up-right diagonal scanning. Rather than up-right diagonal scanning, vertical scanning that scans coefficients of a two-dimensional block form in a column direction, horizontal scanning that scans coefficients of a two-dimensional block form in a row direction may be used according to a size of a transform block or an intra-prediction mode or both. The scanned quantized level may be included in a bitstream by being entropy encoded.

In the decoder, a quantized level may be generated by entropy decoding a bitstream. The quantized level of a one-dimensional vector or array form may be arranged in a two-dimensional block form by performing inverse scanning for the same. Herein, as an inverse scanning method, at least one of up-right diagonal scanning, vertical scanning, and horizontal scanning may be performed.

Dequantization may be performed for the quantized level, secondary inverse transform may be performed according to whether or not to perform secondary inverse transform, and a reconstructed residual signal may be generated by performing primary inverse transform for a result of secondary inverse transform according to whether or not to perform primary inverse transform.

Figure 6:
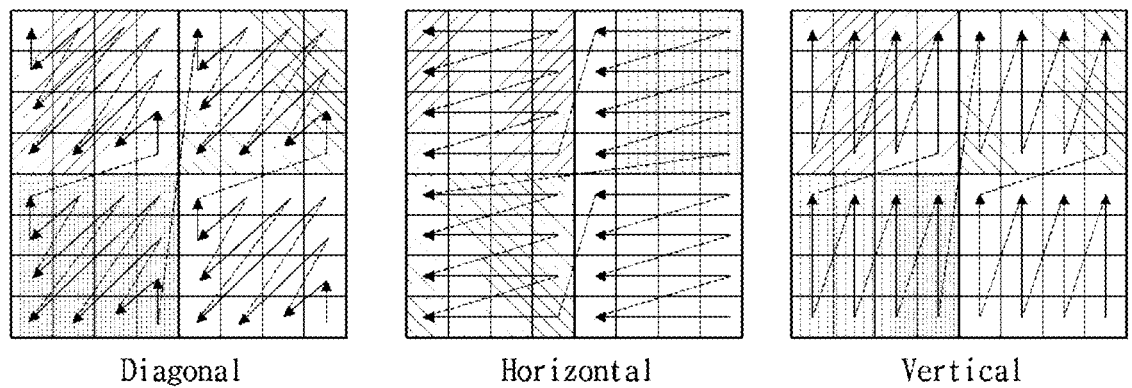
FIG. 6 is a view showing scanning of quantized transform coefficients.

In one embodiment, when a size of a current encoding block is 8×8, a residual signal for the 8×8 block may be entropy encoded by scanning quantized transform coefficients according to at least one of three scanning order methods shown in FIG. 6 showing four scanning orders by 4×4 sub-blocks after primary and secondary transform and quantization. In addition, entropy decoding may be performed by inverse scanning quantized transform coefficients. The inverse scanned quantized transform coefficients become transform coefficients after dequantization, and a reconstructed residual signal may be generated by performing at least one of secondary inverse transform and primary inverse transform for the same.

Hereinafter, with reference to FIGS. 7 to 18, a method of scanning transform coefficients according to an embodiment of the present invention will be described.

In the encoder, scanning for at least one of transform coefficients generated as a result of primary transform for a residual signal of a current block, transform coefficients generated by additionally performing secondary transform for the primary transform result, and coefficients generated by performing quantization may be performed on the basis of a scanning unit and a scanning order.

In the present specification, an output of primary transform, an output of secondary transform, an output of quantization, an output of primary and secondary transform, an output of primary transform and quantization, and an output of primary and secondary transform and quantization may be called transform coefficients. Herein, coefficients that are a result of quantization without performing transform are also called transform coefficients for convenience.

In the decoder, before performing inverse transform for entropy decoded transform coefficients, inverse scanning may be performed on the basis of at least one of a scanning unit and a scanning order. Herein, the transform coefficients may be entropy decoded or dequantized transform or both coefficients.

In below, a scanning unit and a scanning order of transform coefficients will be described on the basis of the encoder, but the same method used in the encoder may be used in the decoder as an inverse scanning unit and an inverse scanning order of transform coefficients.

In the encoder, transform coefficients may be scanned by being quantized. Herein, the scanned transform coefficients may be entropy encoded in the encoder.

In the decoder, entropy decoded transform coefficients may be arranged in a block form by performing inverse scanning for the same. For the transform coefficients arranged in a block form, dequantization, secondary inverse transform, and primary inverse transform after secondary inverse transform or primary inverse transform may be performed. Herein, for the transform coefficients arranged in a block form, inverse transform (secondary inverse transform or primary inverse transform or both) may be performed after dequantization. The inverse transformed transform coefficients may be a reconstructed residual signal of a current block.

In the present specification, an input of dequantization, an input of secondary inverse transform, an input of primary inverse transform, an input of primary and secondary inverse transform, an input of dequantization and primary inverse transform, and an input of dequantization and primary and secondary inverse transform may be called transform coefficients. Herein, coefficients that are an input of dequantization without performing transform are also called transform coefficients for convenience.

In below, scan or scanning may mean performing scanning or inverse scanning in the encoder/decoder. In addition, in the decoder, inverse scanning may be represented as scanning. In addition, a scanning order may refer to a scanning method. Herein, the scanning order may indicate performing at least of diagonal scanning, vertical scanning, and horizontal scanning. In addition, the scanning order is not limited to the above scanning, at least one of first vertical precedence scanning preferentially scanning a first column than other columns, second vertical precedence scanning preferentially scanning a first column and a second column than other columns, first horizontal precedence scanning preferentially scanning a first row than other rows, second horizontal precedence scanning preferentially scanning a first row and a second row than other rows, up-right diagonal scanning, and down-left diagonal scanning may be included.

In addition, an individual coefficient may refer to each transform coefficient.

In addition, in the present specification, first vertical precedence scanning, second vertical precedence scanning, first horizontal precedence scanning, second horizontal precedence scanning may refer to a first vertical precedence scanning order, a second vertical precedence scanning order, a first horizontal precedence scanning order, and a second horizontal precedence scanning order, respectively.

In addition, the first (or second) vertical precedence scanning is not limited to preferentially scanning a first column (or a first column and a second column), and may preferentially scan one selected (or two) column(s).

In addition, the first (or second) horizontal precedence scanning is not limited to preferentially scanning a first row (or a first row and a second row), and may preferentially scan one selected (or two) row(s). Herein, selecting a preferentially scanned column or row may be performed on the basis of at least one of information signaled through a bitstream, information predetermined in the encoder/decoder, a coding parameter, and a look-up table. Alternatively, arbitrary N selected rows or columns may be preferentially scanned than other rows or columns, or may be scanned after the other rows or columns.

A start position and an end position of a scanning order according to an embodiment of the present invention may be respectively defined as up-left and down-right of each block. Alternatively, to the contrary, the start position and the end position of the scanning order may be respectively defined as down-right and up-left of each block. For example, in the encoder and the decoder, a scanning order is defined where an up-left position is used as a start position and a down-right position is used as an end position within a block, but scanning may be performed in a reverse order of the corresponding scanning order when performing entropy encoding/decoding of transform coefficients. Similarly, for example, in the encoder and the decoder, a scanning order defined where a down-right position is used as a start position and an up-left position is used as an end position within a block, but scanning may be performed in a reverse order of the corresponding scanning order when performing entropy encoding/decoding of transform coefficients.

Meanwhile, a start position and an end position of a scanning order according to the present invention is not limited to the above example, and positions of two arbitrary pixels within a block may be determined as a start position and an end position of a scanning order. In one embodiment, at least one of the two arbitrary pixels may be a corner pixel.

Coefficients belonging to a fixed size within a current block (for example, 4×4 square sub-block) may be determined as one coefficient group (CG). In other words, in order to entropy encode/decode transform coefficients, N coefficients within a current block may be defined as one coefficient group. Herein, N may be a positive integer equal to or greater than 0. For example, N may be 16. In addition, a size of the coefficient group may have a J×K size, and J×K coefficients may be included in one coefficient group. Herein, J and K may be a positive integer, and may be values having the difference values or having the same value. In addition, at least of the J and K may be information signaled from the encoder to the decoder, or may be a value preset in the encoder/decoder.

Meanwhile, a flag or a syntax element or both for entropy encoding/decoding transform coefficients may be determined for a coefficient group unit or each individual coefficient unit. In other words, at least one of a flag and a syntax element for transform coefficients may be entropy encoded/decoded for a coefficient group unit or in each individual coefficient unit.

Herein, a flag or a syntax element or both may include at least one of coded_sub_block_flag (hereinafter, CSBF), sig_coeff_flag, coeff_abs_level_greater1_flag, coeff_abs_level_greater2_flag, coeff_abs_level_greater3_flag, coeff_abs_level_greater4_flag, coeff_abs_level_greater5_flag, coeff_sign_flag, and coeff_abs_level_remaining_value.

coded_sub_block_flag may be a syntax element indicating whether or not a transform coefficient of 0 is present in each CG.

sig_coeff_flag may be a syntax element indicating whether or not a transform coefficient is 0.

coeff_abs_level_greater1_flag may be is a syntax element indicating whether or not an absolute value of a transform coefficient is greater than 1.

coeff_abs_level_greater2_flag may be a syntax element indicating whether or not an absolute value of a transform coefficient is greater than 2.

coeff_abs_level_greater3_flag may be a syntax element indicating whether or not an absolute value of a transform coefficient is greater than 3.

coeff_abs_level_greater4_flag may be a syntax element indicating whether or not an absolute value of a transform coefficient is greater than 4.

coeff_abs_level_greater5_flag may be a syntax element indicating whether or not an absolute value of a transform coefficient is greater than 5.

coeff_sign_flag may be a syntax element indicating a sign of a transform coefficient.

coeff_abs_level_remaining_value may be a syntax element indicating a value obtained by substituting N from an absolute value of a transform coefficient when the absolute value of the transform coefficient is greater than N. Herein, N may be a positive integer.

For example, when coeff_abs_level_greater1_flag, and coeff_abs_level_greater2_flag are entropy encoded/decoded, coeff_abs_level_remaining_value may be a syntax element indicating a value obtained by substituting 3 from an absolute value of a transform coefficient when the absolute value of the transform coefficient is greater than 3.

In another embodiment, when coeff_abs_level_greater1_flag, coeff_abs_level_greater2_flag, coeff_abs_level_greater3_flag, coeff_abs_level_greater4_flag, and coeff_abs_level_greater5_flag are entropy encoded/decoded, coeff_abs_level_remaining_value may be a syntax element indicating a value obtained by substituting 6 from an absolute value of a transform coefficient when the absolute value of the transform coefficient is greater than 6.

Meanwhile, at least one of a flag and a syntax element for entropy encoding/decoding transform coefficients while performing scanning transform coefficients within a current block may be entropy encoded/decoded by using a scanning order described hereinafter.

In addition, at least one of flag and syntax elements for entropy encoding/decoding transform coefficients may be entropy encoded or entropy decoded by being scanned according to another scanning order. Herein, a scanning order of at least one of flag and syntax elements for entropy encoding/decoding transform coefficients may be determined on the basis of a coding parameter of a current block.

Meanwhile, transform coefficients to be scanned may refer to at least one of a quantized transform coefficient level, transform coefficients, a quantized level, and residual signal coefficients.

In addition, scanning may be performed for a quantization matrix (quantization matrix or scaling list) by using at least one of scanning orders of transform coefficients. Herein, a scanning order applied to transform coefficients may be in association with a scanning order applied to a quantization matrix. In other words, one of the two scanning orders may be derived on the basis of the other one. For example, both may be identical or may be different by being derived from a predetermined method.

In addition, in below, for convenience, a scanning method performed in the encoder will be described, but it is not limited thereto. Inverse scanning may be performed in the decoder according to a scanning method performed in the encoder.

Subsequently, a scanning unit will be described.

Transform coefficients may be scanned in at least one scanning unit. A scanning unit of transform coefficients according to an embodiment of the present invention may be any one of a regional unit, a coefficient group unit, an individual coefficient unit, and a combination unit. Herein, scanning in a regional unit may refer to perform scanning for respective transform coefficients within a region in which at least one of blocks including a current block is included. Herein, a size of the region may be equal to or greater than a size of the current block. Herein, when performing scanning in a regional unit, transform coefficients may be divided by a coefficient group unit within the region, and scanning is performed among coefficient groups, and scanning is also performed for transform coefficients present within each coefficient group. Scanning in a coefficient group unit may refer to dividing the current block into at least one coefficient group, and performing scanning among coefficient groups and performing scanning for transform coefficients present within each coefficient group. In other words, scanning in a coefficient group unit refers to performing scanning among coefficient groups, and scanning transform coefficients within a coefficient group. In addition, scanning in an individual coefficient unit may refer to perform scanning for respective transform coefficients within the current block rather than using a coefficient group.

In one embodiment, transform coefficients within a current block may be scanned in a coefficient group unit of at least one of 2N×2N, 2N×N, N×2N, 3N×N, N×3N, 3N×2N, 2N×3N, 4N×N, N×4N, 4N×3N, 3N×4N, 8N×N, N×8N, 8N×7N, and 7N×8N (N is integer equal to or greater than 1) sizes or forms, or may be scanned in an individual coefficient unit. Herein, the form may mean whether the block form is at least one of a square, a non-square, a vertically long rectangle, and a horizontally long rectangle.

A scanning unit may be determined on the basis of a size of a current block.

In detail, a scanning unit may be determined by comparing a size of a current block with a predetermined threshold value. Herein, the predetermined threshold value may mean a reference size determining a scanning unit, and may be represented in a form of at least one of a minimum value and a maximum value.

Meanwhile, a predetermined threshold value may be a fixed value predetermined in the encoder/decoder, may be variably derived on the basis of encoding/decoding related parameter (for example, prediction mode (inter prediction or intra prediction) of a current block, an intra-prediction mode, whether or not at least one of primary transform and secondary transform is performed, a transform type, a scanning order, etc.), or may be signaled through a bitstream (for example, sequence, picture, slice, tile, CTU, block level, etc.).

In one embodiment, a block in which the product of horizontal and vertical lengths is equal to or greater than N (for example, N=256) may be scanned in a coefficient group unit, otherwise, the block may be scanned in an individual coefficient unit.

In another embodiment, a block in which a minimum length between horizontal and vertical lengths is M (for example, M=8) may be scanned in a coefficient group unit, otherwise, the block may be scanned in an individual coefficient unit. However, it is not limited thereto. For example, a block having a length equal to or smaller than a threshold value (N or M) may be scanned in a coefficient group unit, otherwise the block may be scanned in an individual coefficient unit.

Meanwhile, a scanning unit may be determined on the basis of a form of a current block.

In one embodiment, when a current block has a rectangle form, the block may be scanned in an individual coefficient unit.

In another embodiment, when a current block has a square form, the block may be scanned in a coefficient group unit. However, it is not limited in the above example. For example, a current block having a rectangle form may be scanned in a coefficient group unit, and a current block having a square form may be scanned in an individual coefficient unit.

Meanwhile, determining a scanning unit may be performed on the basis of an intra-prediction mode of a current block. Herein, a value of the intra-prediction mode may be considered as it is, or whether or not the intra-prediction mode is non-directional mode (DC mode or Planar mode) or whether or not the intra-prediction mode is directional mode (for example, vertical direction or horizontal direction) may be considered.

In one embodiment, when an intra-prediction mode of a current block is at least one of a DC mode and a Planar mode, the current block may be scanned in a coefficient group unit.

In another embodiment, when an intra-prediction mode of a current block is a vertical mode, the current block may be scanned in an individual coefficient unit.

In another embodiment, when an intra-prediction mode of a current block is a horizontal mode, the current block may be scanned in an individual coefficient unit. However, it is not limited to the above example. For example, in case of non-directional mode, a block may be scanned in an individual coefficient unit, and in case of a vertical mode or horizontal mode, a block may be scanned in a coefficient group unit.

Meanwhile, scanning unit related information may be signaled from the encoder to the decoder. Accordingly, the decoder may determine a scanning unit of a current block by using signaled scanning unit related information unit.

Figure 7:
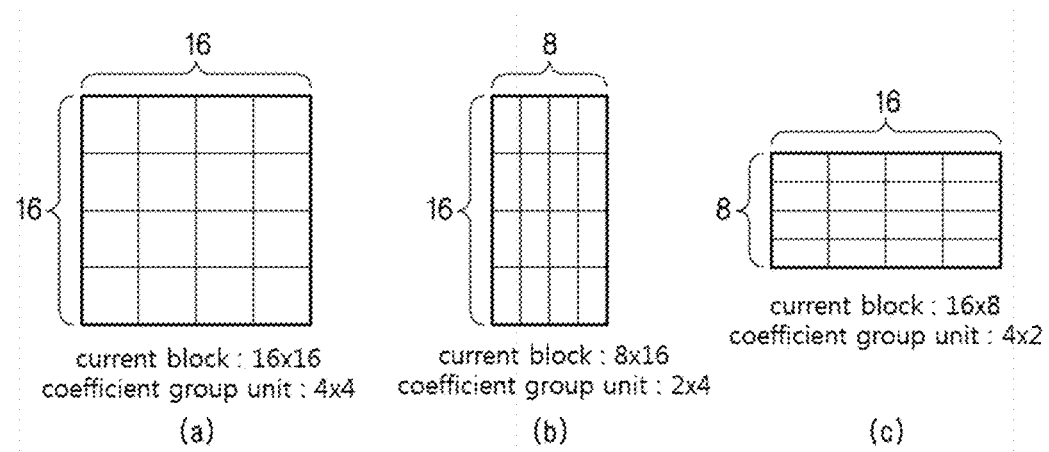
FIGS. 7 to 9 are views showing a scanning unit according to an embodiment of the present invention.
Figure 8:
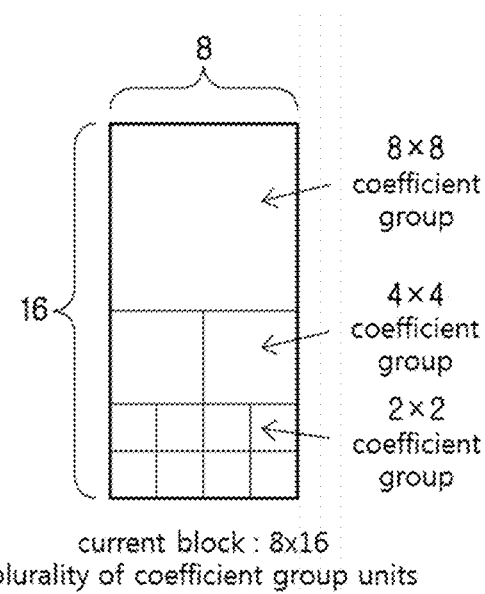
Figure 9:
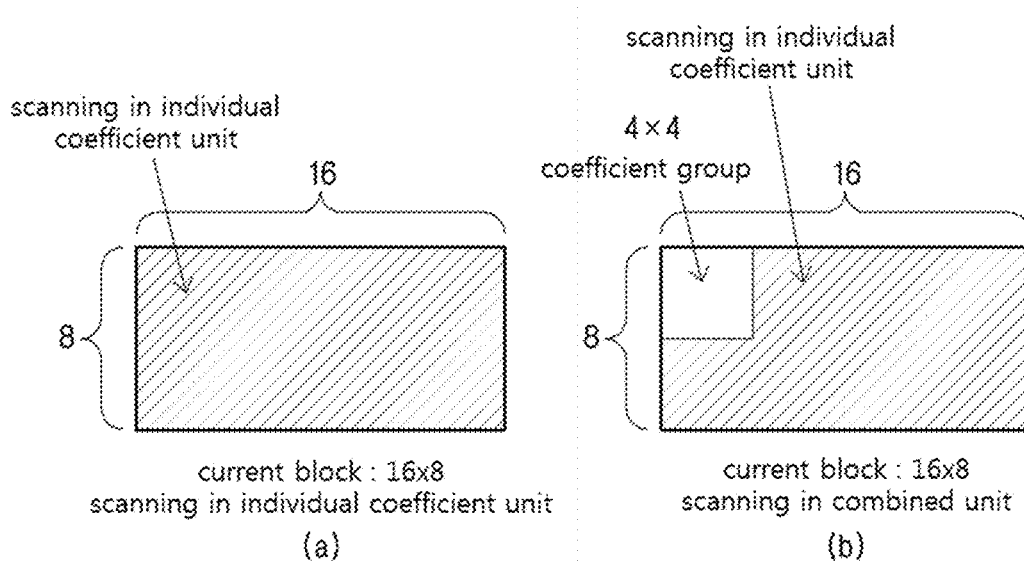

FIGS. 7 to 9 are views showing a scanning unit according to an embodiment of the present invention.

A scanning unit may be determined as a coefficient group unit having a pre-defined fixed size or an individual coefficient unit according to a size or a form or both of a current block. For example, a single coefficient group having an aspect ratio identical to a current block may be used.

A size of a coefficient group unit may be determined on the basis of an aspect ratio of a current block. In addition, transform coefficients within the current block may be scanned in the same coefficient group unit. Herein, the same coefficient group unit may mean that at least one of a size of a coefficient group unit and a form of the coefficient group unit is identical.

In one embodiment, transform coefficients having a 16×16 size within a current block may be scanned in the same coefficient group unit having an 8×8 size.

In one embodiment, transform coefficients having an 8×16 size within a current block may be scanned in the same coefficient group unit having a 4×8 size.

In one embodiment, transform coefficients having a 16×8 size within a current block may be scanned in the same coefficient group unit having an 8×4 size.

In one embodiment, as shown in FIG. 7(a), transform coefficients having a 16×16 size within a current block may be scanned in the same coefficient group unit having a 4×4 size.

In one embodiment, as shown in FIG. 7(b), transform coefficients having an 8×16 size within a current block may be scanned in the same coefficient group unit having a 2×4 size.

In one embodiment, as shown in FIG. 7(c), transform coefficients having a 16×8 size within a current block may be scanned in the same coefficient group unit having a 4×2 size.

Meanwhile, transform coefficients within a current block may be scanned in different coefficient group units. Herein, different coefficient group units may mean that at least one of a size of a coefficient group unit and a form of the coefficient group unit is different.

In one embodiment, as shown in FIG. 8, transform coefficients having an 8×16 size within a current block may be scanned by dividing the same into one coefficient group of 8×8, two coefficient groups of 4×4, and eight coefficient groups of 2×2.

Meanwhile, size information of a coefficient group unit may be signaled from the encoder to the decoder. Accordingly, the decoder may determine a scanning unit of a current block by using signaled size information of the coefficient group unit.

Meanwhile, transform coefficients within a current block may be scanned in an individual coefficient unit. Herein, scanning in an individual coefficient unit may refer to scanning the entire transform coefficients of the current block rather than dividing the current block by a coefficient group.

In one embodiment, as shown in FIG. 9(a), all of transform coefficients having 16×8 size within a current block may be scanned in an individual coefficient unit.

Meanwhile, transform coefficients within a current block may be scanned in a combination unit. Herein, scanning in a combination unit refers to scanning partial coefficients belonging to the transform coefficients within the current block in a coefficient group unit and scanning coefficients of the remaining region in an individual coefficient unit.

In one embodiment, as shown in FIG. 9(b), among transform coefficients having 16×8 size within a current block, transform coefficients belonging to an up-left 4×4 region may be scanned in a 4×4 coefficient group unit, and transform coefficients of the remaining region may be scanned in an individual coefficient unit.

However, it is not limited to the above example, and a size or a form or both of a partial region may be derived on the basis of a size or a form or both of a current block. In one embodiment, when a current block is a 16×8 block, the partial region may be an 8×4 block.

Alternatively, at least one of a horizontal length and a vertical length of a partial region may be derived on the basis of at least one of a horizontal length and a vertical length of a current block.

Alternatively, information indicating a size or a form or both of a partial region may be entropy encoded/decoded.

Alternatively, a size or a form or both of a partial region may be derived from a current block or at least one neighbor block or both.

In addition, a position of a partial region is not limited to up-left of a current block, and may be an arbitrary position within the current block. In one embodiment, the partial region may be positioned at a corner such as down-left, up-right, or down-right of the current block.

Meanwhile, a position of a partial region may be derived on the basis of at least one coding parameter including a size, a form, a depth, a prediction mode, an intra-prediction mode, etc. of a current block. Alternatively, information related to a position of a partial region may be signaled from the encoder to the decoder, or may be derived from information of a current block or at least one neighbor block or both.

Subsequently, a scanning order will be described.

Transform coefficients may be scanned according to at least one scanning order. When scanning transform coefficients in a transform coefficient group unit or individual coefficient unit or both, scanning among coefficient groups or scanning within a coefficient group or both may be performed for transform coefficients within a current block according to at least one scanning order. Herein, scanning for all or a partial of transform coefficients within a current block may be performed.

Figure 10:
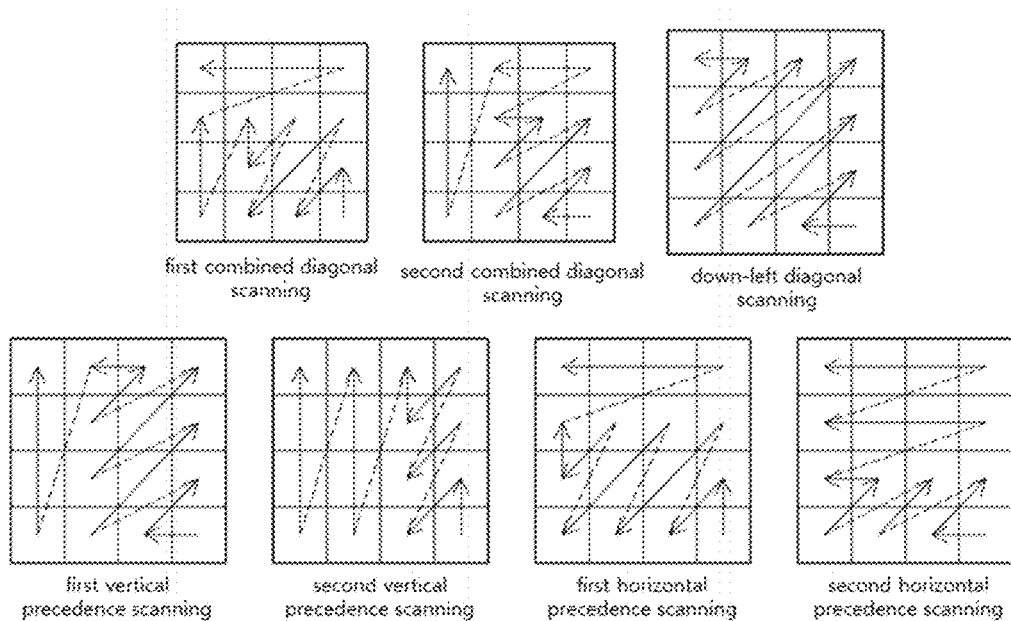
FIG. 10 is a view showing a first combination diagonal scanning order and a second combination diagonal scanning order according to an embodiment of the present invention.

As a scanning order of transform coefficients according to an embodiment of the present invention, any of a diagonal scanning order, a horizontal scanning order, and a vertical scanning order shown in FIG. 6, and a first combination diagonal scanning order, a second combination diagonal scanning order, a down-left diagonal scanning order, a first vertical precedence scanning order, a second vertical precedence scanning order, a first horizontal precedence scanning order, and a second horizontal precedence scanning order shown in FIG. 10 may be used. In addition, transform coefficients may be scanned in an individual coefficient or a transform coefficient group unit or both. Herein, a diagonal scanning order shown in FIG. 6 may mean an up-right diagonal scanning order.

A scanning order may be determined on the basis of a form (square or non-square) of a current block. Herein, the form of the current block may be represented by an aspect ratio of the current block. In other words, a scanning order may be determined on the basis of a ratio of a horizontal length of the current block to a vertical length. Herein, scanning for all or a part of transform coefficients within a current block may be performed.

In one embodiment, when a current block has a square form, scanning is performed by using any one of an up-right diagonal scanning order and a down-left diagonal scanning order, when a current block is a block having a vertical length larger than a horizontal length, scanning is performed by using any one of a vertical scanning order, a first vertical precedence scanning order, and a second vertical precedence scanning order, and when a current block is a block having a vertical length smaller than a horizontal length, scanning may be performed by using any one of a horizontal scanning order, a first horizontal precedence scanning order, and a second horizontal precedence scanning order.

In another embodiment, when a current block has a square form, scanning may be performed by using any one of an up-right diagonal scanning order and a down-left diagonal scanning order, when a current block is a block having a vertical length larger than a horizontal length, scanning may be performed by using any one of a horizontal scanning order, a first horizontal precedence scanning order, and a second horizontal precedence scanning order, and when current block is a block having a vertical length smaller than a horizontal length, scanning may be performed by using any one of a vertical scanning order, a first vertical precedence scanning order and a second vertical precedence scanning order. Meanwhile, it is not limited to the above example. For example, usable scanning orders when a current block is a non-square (rectangle form), and usable scanning orders when a current block is square (square form) may be opposite to the above example or may differ from the above example.

In another embodiment, when a current block has a rectangle (non-square) form, transform coefficient groups or individual coefficients may be scanned according to at least one of a horizontal scanning order, a first horizontal precedence scanning order, a second horizontal precedence scanning order, a vertical scanning order, a first vertical precedence scanning order, and a second vertical precedence scanning order.

In another embodiment, when a current block has a square form, transform coefficient groups or individual coefficients may be scanned according to at least one of an up-right diagonal scanning order, and a down-left diagonal scanning order. However, it is not limited to the above example. For example, usable scanning orders when a current block has a rectangle form, and usable scanning orders when a current block has a square form may be opposite to the above example, may differ from the above example.

Figure 11:
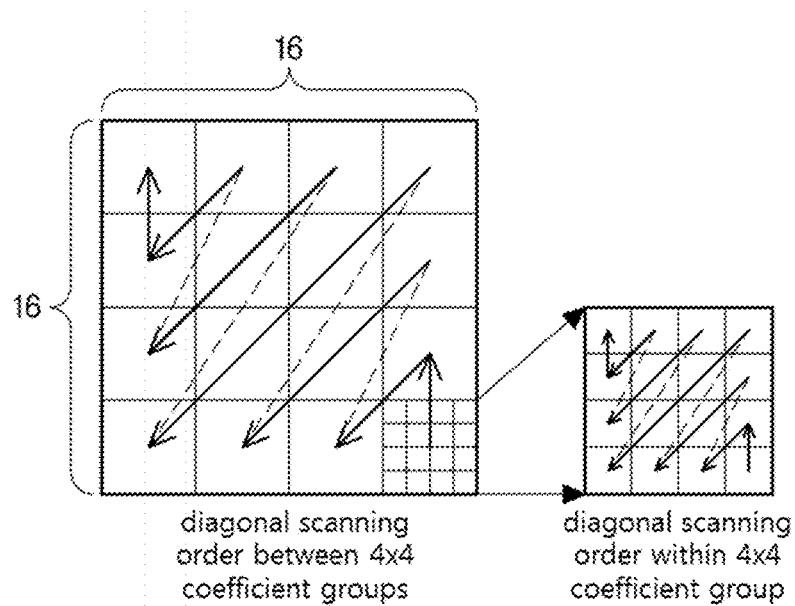
FIGS. 11 to 13 are views showing a relation between scanning within a coefficient group and scanning among coefficient groups when performing scanning in a coefficient group unit.
Figure 12:
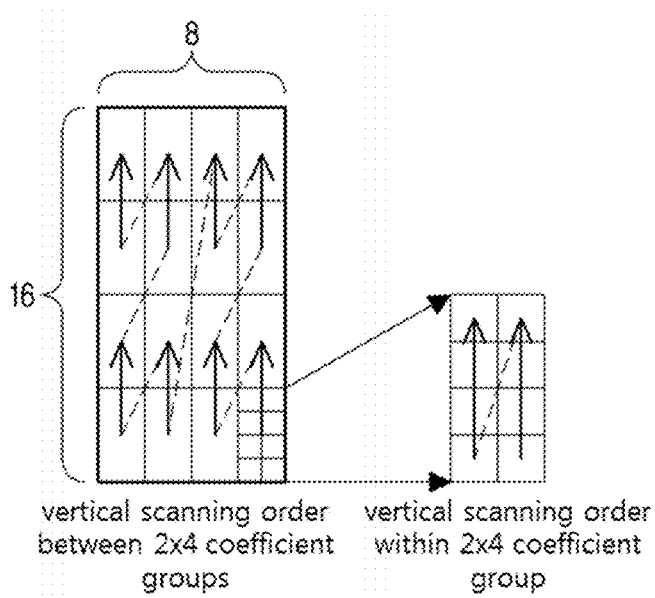
Figure 13:
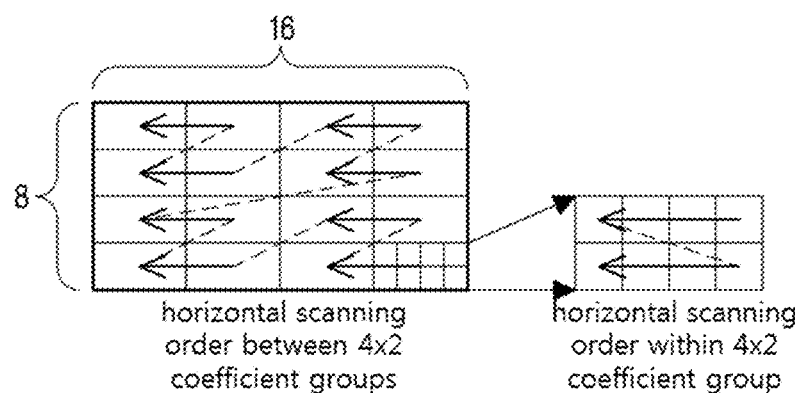

FIGS. 11 to 13 are views showing a relation between scanning within a coefficient group and scanning among coefficient groups when performing scanning in a coefficient group unit. When performing scanning in a coefficient group unit, scanning may be performed by using the same scanning order for scanning within a coefficient group and for scanning among coefficient groups.

In one embodiment, as shown in FIG. 11, when transform coefficients having a 16×16 size within a current block are scanned in a 4×4 coefficient group unit, scanning for coefficients within a coefficient group and scanning for coefficient group units may be performed according to an up-right diagonal scanning order.

In another embodiment, as shown in FIG. 12, when transform coefficients having an 8×16 size within a current block are scanned in a 2×4 coefficient group unit, scanning for coefficients within a coefficient group and scanning for coefficient group units may be performed according to a vertical scanning order.

In another embodiment, as shown in FIG. 13, when transform coefficients having a 16×8 size within a current block are scanned in a 4×2 coefficient group unit, scanning for coefficients within a coefficient group and scanning for coefficient group units may be performed according to a horizontal scanning order.

In another embodiment, when transform coefficients having a 8×8 size within a current block is scanned are a 4×4 coefficient group unit, scanning for coefficients within a coefficient group and scanning for coefficient group units may be performed according to a down-left diagonal scanning order.

In another embodiment, when transform coefficients having a 4×8 size within a current block are scanned in a 4×4 coefficient group unit, scanning for coefficients within a coefficient group and scanning for coefficient group units may be performed according to a first vertical precedence scanning order.

In another embodiment, when transform coefficients having an 8×4 size within a current block are scanned in a 4×2 coefficient group unit, scanning for coefficients within a coefficient group and scanning for coefficient group units may be performed according to a first horizontal precedence scanning order.

On the other hand, when performing scanning in a coefficient group unit, scanning orders different from each other may be used for scanning within a coefficient group and scanning among coefficient groups.

In one embodiment, when transform coefficients having a 16×16 size within a current block are scanned in a 4×4 coefficient group unit, coefficients within a coefficient group may be scanned according to an up-right diagonal scanning order, and coefficient group units may be scanned according to a horizontal or vertical scanning order.

In another embodiment, when transform coefficients having an 8×16 size within a current block are scanned in a 2×4 coefficient group unit, coefficients within a coefficient group may be scanned according to a vertical scanning order, and coefficient group units may be scanned according to an up-right diagonal or horizontal scanning order.

In another embodiment, when transform coefficients having a 16×8 size within a current block are scanned in a 4×2 coefficient group unit, coefficients within a coefficient group may be scanned according to a horizontal scanning order, and coefficient group units may be scanned according to an up-right diagonal or vertical scanning order.

In another embodiment, when transform coefficients having an 8×8 size within a current block are scanned in a 4×4 coefficient group unit, coefficients within a coefficient group may be scanned according to a down-left diagonal scanning order, and coefficient group units may be scanned according to an up-right diagonal scanning order.

In another embodiment, when transform coefficients having a 4×8 size within a current block are scanned in a 4×4 coefficient group unit, coefficients within a coefficient group may be scanned according to a first vertical precedence scanning or a second vertical precedence scanning order, and coefficient group units may be scanned according to an up-right diagonal or down-left diagonal scanning order.

In another embodiment, when transform coefficients having an 8×4 size within a current block are scanned in a 4×4 coefficient group unit, coefficients within a coefficient group may be scanned according to a first horizontal precedence scanning or a second horizontal precedence scanning order, and coefficient group units may be scanned according to an up-right diagonal or down-left diagonal scanning order.

Meanwhile, information indicating whether or not scanning orders different from each other may be used for scanning within a coefficient group and for scanning among coefficient groups when performing scanning in a coefficient group may be signaled in a higher level from the encoder to the decoder. Herein, a unit of the higher level may be at least one of, for example, a video parameter set (VPS), a sequence parameter set (SPS), a picture parameter set (PPS), a slice, a tile, and a CTU. In addition, information of whether or not different types of scanning orders are used in a block unit such as coding tree unit, coding unit, prediction unit, transform unit, etc. may be entropy encoded/decoded. In one embodiment, when scanning in a coefficient group, information indicating whether or not different scanning orders are used for scanning within a coefficient group and scanning among coefficient groups may be represented in a flag form.

Meanwhile, when scanning in an individual coefficient unit, all or a part of transform coefficients within a current block may be scanned according to one scanning order.

A scanning order may be determined on the basis of a form of a current block when performing scanning in an individual coefficient unit. Herein, the form of the current block may be represented in an aspect ratio of the current block. In other words, a scanning order may be determined on the basis of comparison between a horizontal length and a vertical length of the current block.

In another embodiment, as shown in FIG. 14(a), transform coefficients having an 8×8 size within a current block may be scanned in an individual coefficient unit by using any one of an up-right diagonal scanning order and a down-left diagonal scanning order, as shown in FIG. 14(b), transform coefficients having a 4×8 size within a current block may be scanned in an individual coefficient unit by using any one of a vertical scanning order, a first vertical precedence scanning order, and a second vertical precedence scanning order, and as shown in FIG. 14(c), transform coefficients having an 8×4 size within a current block may be scanned in an individual coefficient unit by using any one of a horizontal scanning order, a first horizontal precedence scanning order, and a second horizontal precedence scanning order.

Figure 14:
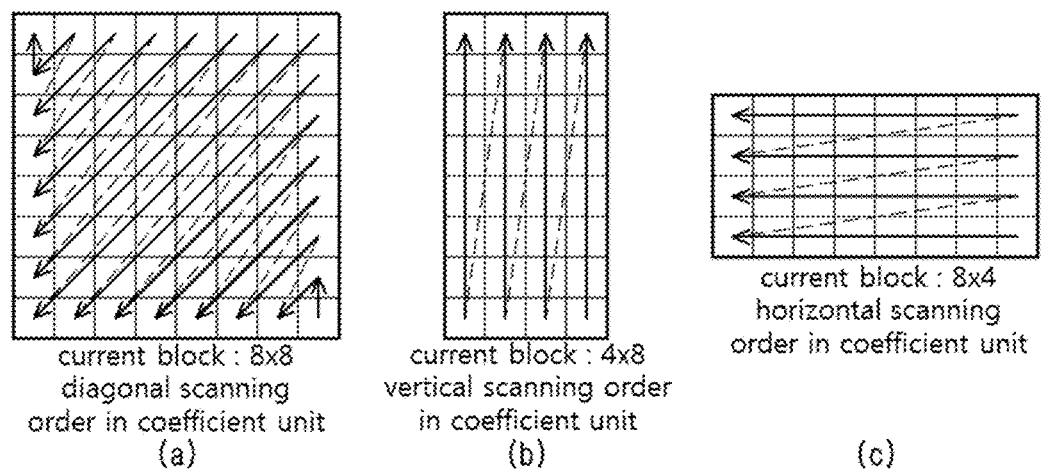
FIG. 14 is a view showing an example of determining a scanning order on the basis of a form of a current block.

In addition, although not shown in FIG. 14, when a current block has a square form, transform coefficients within a current block may be scanned in an individual coefficient unit by using any one of a up-right diagonal scanning order or a down-left diagonal scanning order, when a current block has a non-square form having a vertical length larger than a horizontal length, transform coefficients within a current block may be scanned in an individual coefficient unit by using any one of a horizontal scanning order, a first horizontal precedence scanning order, and a second horizontal precedence scanning order, and when a current block has a non-square form having a vertical length smaller than a horizontal length, transform coefficients within a current block may be scanned in an individual coefficient unit by using any one of a vertical scanning order, a first vertical precedence scanning order, and a second vertical precedence scanning order.

Meanwhile, when scanning transform coefficients, a scanning order mapped according to a size or a form or both of a current block may be used. Herein, the form may mean whether or not the block is a square, a horizontally long rectangle, or a vertically long rectangle.

Meanwhile, a scanning order may be determined on the basis of a size of a current block.

In detail, a scanning order may be determined on the basis of comparison between a size of a current block and a predetermined threshold value. Herein, the predetermined threshold value may mean a reference size determining a scanning unit, and may be represented in a form of at least one of a minimum value and a maximum value.

Meanwhile, a predetermined threshold value may be a fixed value pre-defined in the encoder/decoder, may be variably derived on the basis of encoding/decoding related parameter of a current block (for example, a prediction mode, an intra-prediction mode, a transform type, a scanning order, etc.), or may be signaled through a bitstream (for example, a sequence, a picture, a slice, a tile, a CTU, a block level, etc.). Herein, scanning for all or a part of transform coefficient within a current block may be performed.

In one embodiment, in case of a block where a product of horizontal and vertical lengths is equal to or greater than 256, transform coefficient groups or individual coefficients may be scanned according to any one of an up-right diagonal scanning order and a down-left diagonal scanning order, otherwise, transform coefficient groups or individual coefficients may be scanned according to any one of a horizontal scanning order, a first horizontal precedence scanning order, and a second horizontal precedence scanning order, or any one of a vertical scanning order, a first vertical precedence scanning order, and a second vertical precedence scanning order. Meanwhile, a threshold value that is compared with the product of horizontal and vertical lengths is not limited to 256. Herein, the threshold value may be, for example, an arbitrary positive integer. Alternatively, N (N being a positive integer) threshold values may be present. When N threshold values are present, a scanning order in association with a section to which the current block belongs among N+1 sections may be applied to a current block.

In another embodiment, in case of a block in which a minimum length between horizontal and vertical lengths is equal to or smaller than 8, transform coefficient groups or individual coefficients may be scanned according to any one of an up-right diagonal scanning order and a down-left diagonal scanning order, otherwise, transform coefficient groups or individual coefficients may be scanned according to any one of a horizontal scanning order, a first horizontal precedence scanning order, and a second horizontal precedence scanning order, and any one of a vertical scanning order, a first vertical precedence scanning order, and a second vertical precedence scanning order. Meanwhile, the threshold value that is compared with the minimum length among horizontal and vertical lengths is not limited to 8. The threshold value may be, for example, an arbitrary positive integer. Alternatively, N (N being positive integer) threshold values may be present. When N threshold values are present, a scanning order in association with a section to which a current block belongs among N+1 sections may be applied to a current block.

In another embodiment, when a size of a current block has a minimum block size that is not divided further, a predetermined scanning order may be applied. The predetermined scanning order may be, for example, an up-right diagonal scanning or down-left diagonal scanning order. Information related to the minimum block size may be signaled in at least one unit of for example, a VPS, a SPS, a PPS, a slice, a tile, a CTU, a block, etc.

Meanwhile, a scanning order may be determined on the basis of a depth of a current block.

A scanning order may be determined on the basis of comparison between a depth of a current block and a predetermined threshold value. The predetermined threshold value means a reference size or depth determining a scanning order. The predetermined threshold value may be represented in a form of at least one of a minimum value and a maximum value. The predetermined threshold value may be a fixed value predefined in the encoder/decoder, may be variably derived on the basis of an encoding/decoding parameter of a current block (for example, a prediction mode, an intra-prediction mode, a transform type, a scanning order, etc.), or may be signaled through a bitstream (for example, a sequence, a picture, a slice, a tile, a CTU, a block level, etc.). Herein, scanning for all or a part of transform coefficients within a current block may be performed.

In one embodiment, when a current block has a depth of 0, transform coefficient groups or individual coefficients may be scanned according to an up-right diagonal scanning order or a down-left diagonal scanning order, when a current block has a depth other than 0, transform coefficient groups or individual coefficients may be scanned according to at least one of a horizontal scanning order, a first horizontal precedence scanning order, a second horizontal precedence scanning order, a vertical scanning order, a first vertical precedence scanning order, and a second vertical precedence scanning order.

In another embodiment, when a current block has a depth equal to or smaller than 1, transform coefficient groups or individual coefficients may be scanned according to an up-right diagonal scanning order or a down-left diagonal scanning order, and when a current block has a depth greater than 1, transform coefficient groups or individual coefficients may be scanned according to any one of a horizontal scanning order, a first horizontal precedence scanning order, a second horizontal precedence scanning order, a vertical scanning order, a first vertical precedence scanning order, and a second vertical precedence scanning order. Meanwhile, the threshold value that is compared with a depth of a current block is not limited to 0 or 1. Herein, the threshold value may be, for example, a positive integer equal to or greater than 0. Alternatively, N (N being a positive integer) threshold values may be present. When N threshold values are present, a scanning order in association with a section to which a current block belongs among N+1 sections may be applied to a current block.

In another embodiment, when a current block has a maximum division depth that is not divided further, a predetermined scanning order may be applied. Herein, the predetermined scanning order may be, for example, a diagonal scanning order. In addition, information related to a maximum division depth may be signaled in at least one unit of, for example, a VPS, a SPS, a PPS, a slice, a tile, a CTU, and a block.

Meanwhile, a scanning order may be determined on the basis of an intra-prediction mode of a current block. Herein, a value of an intra-prediction mode may be considered as it is, and whether or not an intra-prediction mode is non-directional mode or a direction of an intra-prediction mode (for example, vertical direction or horizontal direction) may be considered. Herein, scanning for all or a part of transform coefficients within a current block may be performed.

In one embodiment, when an intra-prediction mode of a current block is at least one of a DC mode and a Planar mode, transform coefficient groups or individual coefficients may be scanned according to any one of an up-right diagonal scanning order and a down-left diagonal scanning order.

In another embodiment, when an intra-prediction mode of a current block is a vertical mode, transform coefficient groups or individual coefficients may be scanned according to any one of a horizontal scanning order, a first horizontal precedence scanning order, a second horizontal precedence scanning order, a vertical scanning order, a first vertical precedence scanning order, and a second vertical precedence scanning order.

In another embodiment, when an intra-prediction mode of a current block is a horizontal mode, transform coefficient groups or individual coefficients may be scanned according to any one of a horizontal scanning order, a first horizontal precedence scanning order, a second horizontal precedence scanning order, a vertical scanning order, a first vertical precedence scanning order, and a second vertical precedence scanning order.

In another embodiment, when an intra-prediction mode of a current block is a vertical mode or a horizontal mode, transform coefficient groups or individual coefficients may be scanned according to at least one of an up-right diagonal scanning order and a down-left diagonal scanning order.

In another embodiment, when an intra-prediction mode of a current block is included in K modes adjacent to a vertical mode or a horizontal mode, transform coefficient groups or individual coefficients may be scanned according to at least one of a horizontal scanning order and a down-left diagonal scanning order. Herein, K may be a positive integer equal to or greater than 1. Herein, K modes adjacent to a vertical mode or a horizontal mode may be intra-prediction modes corresponding to values obtained by adding −K/2 to K/2 values to a specific intra-prediction mode value indicated by a vertical mode or a horizontal mode.

In another embodiment, when an intra-prediction mode of a current block is included in K modes adjacent to a vertical mode or a horizontal mode, transform coefficient groups or individual coefficients may be scanned according to at least one of a horizontal scanning order, a first horizontal precedence scanning order, a second horizontal precedence scanning order, a vertical scanning order, a first vertical precedence scanning order, and a second vertical precedence scanning order. Herein, K may be a positive integer equal to or greater than 1. Herein, K modes adjacent to a vertical mode or a horizontal mode may be intra-prediction modes corresponding to values obtained by adding −K/2 to K/2 values to a specific intra-prediction mode value indicated by a vertical mode or a horizontal mode.

In another embodiment, when an intra-prediction mode of a current block is present in an even number, transform coefficient groups or individual coefficients may be scanned according to at least one of an up-right diagonal scanning order and a down-left diagonal scanning order. In addition, when an intra-prediction mode of a current block is present in an odd number, transform coefficient groups or individual coefficients may be scanned according to any one of a horizontal scanning order, a first horizontal precedence scanning order, a second horizontal precedence scanning order, a vertical scanning order, first vertical precedence scanning order, a second vertical precedence scanning order, and a down-left diagonal scanning order.

In another embodiment, when an intra-prediction mode of a current block is present in an odd number, transform coefficient groups or individual coefficients may be scanned according to any one of an up-right diagonal scanning order and a down-left diagonal scanning order. In addition, when an intra-prediction mode of a current block is present in an even number, transform coefficient groups or individual coefficients may be scanned according to any one of a horizontal scanning order, a first horizontal precedence scanning order, a second horizontal precedence scanning order, a vertical scanning order, a first vertical precedence scanning order, a second vertical precedence scanning order, and a down-left diagonal scanning order.

In another embodiment, regardless of an intra-prediction mode of a current block, transform coefficient groups or individual coefficients may be scanned according to any one of an up-right diagonal scanning order and a down-left diagonal scanning order.

In another embodiment, according to a result obtained by performing an modulo (MOD, %) operation for an IPM that is a value of an intra-prediction mode of a current block, any one of an up-right diagonal scanning order, a down-left diagonal scanning order, a horizontal scanning order, a first horizontal precedence scanning order, a second horizontal precedence scanning order, a vertical scanning order, a first vertical precedence scanning order, and a second vertical precedence scanning order may be determined as a scanning order for transform coefficient groups or individual coefficients. Herein, the modulo operation may mean a mathematical operation that computes the remainder of the division. In other words, at least one of the scanning orders may be determined according to a value of (IPM MOD M). In below, an IPM of 0 may mean indicating a Planar mode, and an IPM of 1 may mean indicating a DC mode.

For example, when ((IPM−2) MOD 2) is 0, transform coefficient groups or individual coefficients may be scanned according to an up-right diagonal scanning order. In addition, when ((IPM−2) MOD 2) is 1, transform coefficient groups or individual coefficients may be scanned according to a down-left diagonal scanning order.

For example, when ((IPM−2) MOD 4) is 0, transform coefficient groups or individual coefficients may be scanned according to an up-right diagonal scanning order. In addition, when ((IPM−2) MOD 4) is 1, transform coefficient groups or individual coefficients may be scanned according to a down-left diagonal scanning order. In addition, when ((IPM−2) MOD 4) is 2, transform coefficient groups or individual coefficients may be scanned according to a vertical scanning order. In addition, when ((IPM−2) MOD 4) is 3, transform coefficient groups or individual coefficients may be scanned according to a horizontal scanning order.

In addition, a predetermined number of directional prediction modes may be grouped into one group, and based on to which group an intra-prediction mode of a current block belongs, a scanning order in association with the corresponding group may be determined as a scanning order of a current block. Herein, a number of directional prediction modes included in the group may be identical to or different from a number of directional prediction modes included in another group. Herein, grouping may be performed on the basis of angle or direction similarity of directional prediction modes.

In one embodiment, a predetermined number of modes adjacent to a first mode are classified into a first mode group, and a scanning order in association with a first mode group may be applied to a current block having an intra-prediction mode included in the first mode group. For example, the first mode may be a vertical mode, a horizontal mode, a diagonal mode, etc.

Meanwhile, grouping may be performed on the basis of a modulo operation of a value indicating a directional prediction mode. Herein, a divisor used in the modulo operation may be determined on the basis of a size, a form, or a depth of a current block. When the size of the current block becomes larger, a larger divisor (or smaller divisor) may be used. When the divisor becomes larger, a number of groups by the modulo operation becomes larger, and thus determining of a scanning order may be performed in detail.

In addition, based on an intra-prediction mode (direction) of a current block, a plurality (for example, N, N being an integer equal to or greater than 2) of scanning orders may be determined. Herein, N scanning orders may be a plurality of scanning orders preset in the encoder/decoder according to an intra-prediction mode. N scanning orders different from each other may be determined according to an intra-prediction mode. Herein, N scanning orders may include at least one of diagonal scanning, vertical scanning, horizontal scanning, up-right diagonal scanning, down-left diagonal scanning, first vertical precedence scanning, second vertical precedence scanning, first horizontal precedence scanning, and second horizontal precedence scanning.

In one embodiment, when an intra-prediction mode of a current block is at least one of a DC mode and a Planar mode, transform coefficient groups or individual coefficients may be scanned according to information of a scanning order between two scanning orders (up-right diagonal scanning order and down-left diagonal scanning order).

In another embodiment, when an intra-prediction mode of a current block is a vertical mode, transform coefficient groups or individual coefficients may be scanned according to information of a scanning order between two scanning orders (horizontal scanning order and down-left diagonal scanning order).

In another embodiment, when an intra-prediction mode of a current block is a vertical mode, and included in K neighbor modes, transform coefficient groups or individual coefficients may be scanned according to information of a scanning order between two scanning orders (horizontal scanning order and down-left diagonal scanning order). Herein, K may be a positive integer equal to or greater than 1.

In another embodiment, when an intra-prediction mode of a current block is a vertical mode, and included in K neighbor modes, transform coefficient groups or individual coefficients may be scanned according to information of a scanning order among three scanning orders (horizontal scanning order, down-left diagonal scanning order, and first horizontal precedence scanning order). Herein, K may be a positive integer equal to or greater than 1.

In another embodiment, when an intra-prediction mode of a current block is a horizontal mode, transform coefficient groups or individual coefficients may be scanned according to information of a scanning order between two scanning orders (vertical scanning order and up-right diagonal scanning order).

In another embodiment, when an intra-prediction mode of a current block is a horizontal mode, and included in K neighbor modes, transform coefficient groups or individual coefficients may be scanned according to information of a scanning order between two scanning orders (vertical scanning order and up-right diagonal scanning order). Herein, K may be a positive integer equal to or greater than 1.

In another embodiment, when an intra-prediction mode of a current block is a horizontal mode, and included in K neighbor modes, transform coefficient groups or individual coefficients may be scanned according to information of a scanning order among three scanning orders (vertical scanning order, up-right diagonal scanning order, and first vertical precedence scanning order). Herein, K may be a positive integer equal to or greater than 1.

In another embodiment, when the vertical mode or the horizontal mode has a specific intra-prediction mode value, K neighbor modes adjacent to the vertical mode or the horizontal mode may be intra-prediction modes corresponding to values obtained by adding −K/2 to K/2 values to the specific intra-prediction mode value indicated by the vertical mode or the horizontal mode.

Meanwhile, information related to a scanning order may be signaled from the encoder to the decoder. Accordingly, the decoder may determine a scanning order of a current block by using signaled information related to the scanning order. In one embodiment, the information related to the scanning order may be information indicating a diagonal scanning order, a vertical scanning order, a horizontal scanning order, a first combination diagonal scanning order, a second combination diagonal scanning order, an up-right diagonal scanning order, a down-left diagonal scanning order, a first vertical precedence scanning order, a second vertical precedence scanning order, a first horizontal precedence scanning order, a second horizontal precedence scanning order, etc. Herein, the information related to the scanning order may be entropy encoded/decoded in a flag or index form.

Meanwhile, a scanning order of a current block may be determined on the basis of a scanning order used in a neighbor block adjacent to the current block or a coding parameter of the current block.

For example, transform coefficients within a current block may be scanned by using a scanning order identically used in at least one of a left block, a right block, an upper block, and a lower block which are adjacent to the current block. Herein, a list including at least one scanning order of neighbor blocks may be configured, and a scanning order of the current block may be derived by using an index of the list. The index may be entropy encoded/decoded.

Alternatively, a statistical value of at least one of scanning orders used in neighbor blocks may be used. For example, a scanning order in association with at least one of an average value, a weight average value, a minimum value, a maximum value, a mode, and a median value of values indicating a scanning order may be determined as a scanning order of the current block.

Meanwhile, when scanning is performed in a coefficient group unit, a scanning order of transform coefficients in a current coefficient group within a current block may be determined on the basis of a scanning order used in a neighbor coefficient group adjacent to the current coefficient group. For example, transform coefficients within a current coefficient group may be scanned by using a method identical to a scanning order within a coefficient group which is used in at least one of a left coefficient group, a right coefficient group, an upper coefficient group, and a lower coefficient group which are adjacent to the current coefficient group.

In addition, information related to a scanning order may be entropy encoded/decoded in information related to at least one of a scanning order between coefficient groups and a scanning order within a coefficient group. In other words, information of a scanning order among coefficient groups and information of a scanning order within a coefficient group may be respectively entropy encoded/decoded. Alternatively, information of a scanning order between coefficient groups and information of a scanning order within a coefficient group may be entropy encoded/decoded in a single piece of information.

Alternatively, a scanning order of a neighbor block to which a prediction mode identical to an intra-prediction mode of a current block is applied may be selectively used. When a plurality of neighbor blocks to which a prediction mode identical to an intra-prediction mode of a current block is applied is present, as described above, a scanning order of a current block may be determined by configuring a list and applying an index.

At least one of a scanning unit and a scanning order of transform coefficients described above may be determined on the basis of at least one of a transform type applied to a current block, a transform position, a region to which transform is applied, whether or not transform is performed, whether or not primary transform is performed, whether or not secondary transform is performed, a block size, a block form, and an intra-prediction mode (or direction). Herein, at least one of the scanning unit and the scanning order may be entropy encoded/decoded.

Herein, a transform position may be information indicating whether or not specific transform is used as vertical transform or whether or not specific transform is used as horizontal transform. In addition, whether or not transform is performed may refer to whether or not at least one of primary transform and secondary transform is performed. In addition, a transform type may indicate a transform type based on at least one trigonometric function among transforms based on DCT and based on DST such as DCT-II, DCT-V, DCT-VIII, DST-I, DST-VI, DST-VII, etc., and may indicate at least one of a Karhunen-Loeve transform (KLT), and directional transform.

As primary transform, identity transform may be performed. Herein, identity transform may be applied to at least one of horizontal transform and vertical transform.

For example, when identity transform is applied to both vertical transform and horizontal transform for a current block, the current block may be the same like as transform is not performed for the same.

For example, when identity transform is used as vertical transform for a current block, the current block may be the same as like only primary horizontal transform is performed for the same, and when identity transform is used as horizontal transform for a current block, the current may be the same as like as only primary vertical transform is performed for the same.

In addition, identity transform may be used as primary transform for a current block, and secondary transform may be performed. Herein, the current block may be the same as like as only secondary transform is performed for the current block.

Whether or not to use identity transform as horizontal transform and vertical transform may be determined on the basis of at least one coding parameter such as prediction mode, intra-prediction mode (direction), block size, block form, etc. of a current block.

In addition, deblocking filtering may not be performed for a block for which identity transform is performed.

When transform is performed by combining identity transform and another transform as primary transform, a scanning order may be determined according to a transform position where identity transform is used. Herein, identity transform may be a matrix where values of a main diagonal line (diagonal line from left upper to right lower) are 1 and other elements are 0 as shown in an n×n matrix $I_n$ of Formula 1 below.

$$I_1 = [1], I_2 = \begin{bmatrix} 1 & 0 \\ 0 & 1 \end{bmatrix}, I_3 = \begin{bmatrix} 1 & 0 & 0 \\ 0 & 1 & 0 \\ 0 & 0 & 1 \end{bmatrix}, \ldots, I_n = \begin{bmatrix} 1 & 0 & \ldots & 0 \\ 0 & 1 & \ldots & 0 \\ \vdots & \vdots & \ddots & \vdots \\ 0 & 0 & \ldots & 1 \end{bmatrix} \quad \text{[Formula 1]}$$

In one embodiment, when transform is performed by using identity transform as horizontal transform and by using as vertical transform at least one of DCT based transform and DST based transform such as DCT-II, DCT-V, DCT-VIII, DST-I, DST-VI, DST-VII, etc., transform coefficient groups or individual coefficients may be scanned according to any one of a vertical scanning order, a first vertical precedence scanning order, and a second vertical precedence scanning order.

In another embodiment, when transform is performed by using as horizontal transform at least one of DCT based transform and DST based transform such as DCT-II, DCT-V, DCT-VIII, DST-I, DST-VI, DST-VII, etc., and by using identity transform as vertical transform, transform coefficient groups or individual coefficients may be scanned according to any one of a horizontal scanning order, a first horizontal precedence scanning order, and a second horizontal precedence scanning order.

In another embodiment, when transform is performed by using identity transform as horizontal transform and by using as vertical transform at least one DCT based transform and DST based transform such as DCT-II, DCT-V, DCT-VIII, DST-I, DST-VI, DST-VII, etc., transform coefficient groups or individual coefficients may be scanned according to any one of a horizontal scanning order, a first horizontal precedence scanning order, and a second horizontal precedence scanning order.

In another embodiment, when transform is performed by using as horizontal transform at least one of DCT based transform and DST based transform such as DCT-II, DCT-V, DCT-VIII, DST-I, DST-VI, DST-VII, etc., and by using identity transform as vertical transform, transform coefficient groups or individual coefficients may be scanned according to any one of a vertical scanning order, a first vertical precedence scanning order, and a second vertical precedence scanning order.

In another embodiment, when identity transform is performed for at least one of horizontal transform and vertical transform, transform coefficient groups or individual coefficients may be scanned according to any one of up-right diagonal scanning and down-left diagonal scanning.

In addition, a scanning order may be determined on the basis of whether or not identity transform is performed.

Meanwhile, when DCT based transform or DST based transform is performed for a transform block as primary transform, a scanning order may be determined according to which transform between DCT based transform and DST based transform is used as vertical transform or horizontal transform. Herein, DCT based transform may mean at least one of DCT-II, DCT-V, DCT-VIII, etc. transforms. In addition, DST based transform may mean at least one of DST-I, DST-VI, DST-VII, etc. transforms. Herein, DCT based transform and DST based transform may respectively mean DCT transform and DST transform.

In one embodiment, when transform is performed by using DCT transform as horizontal transform and by using DST transform as vertical transform, transform coefficient groups or individual coefficients may be scanned according to any one of a vertical scanning order, a first vertical precedence scanning order, and a second vertical precedence scanning order.

In another embodiment, when transform is performed by using DST transform as horizontal transform and by using DCT transform as vertical transform, transform coefficient groups or individual coefficients may be scanned according to any one of a horizontal scanning order, a first horizontal precedence scanning order, and a second horizontal precedence scanning order.

In another embodiment, when transform is performed by using DCT transform as horizontal transform and by using DST transform as vertical transform, transform coefficient groups or individual coefficients may be scanned according to any one of a horizontal scanning order, a first horizontal precedence scanning order, and a second horizontal precedence scanning order.

In another embodiment, when transform is performed by using DST transform as horizontal transform and by using DCT transform as vertical transform, transform coefficient groups or individual coefficients may be scanned according to any one of a vertical scanning order, a first vertical precedence scanning order, and a second vertical precedence scanning order.

In another embodiment, when DCT or DST transform is performed for a transform block as primary transform, transform coefficient groups or individual coefficients may be scanned according to any one of an up-right diagonal scanning order and a down-left diagonal scanning order.

In another embodiment, when DCT or DST transform is used in horizontal transform as primary transform and DCT or DST transform is performed in vertical transform, transform coefficient groups or individual coefficients may be scanned according to any one of up-right diagonal scanning and a down-left diagonal scanning.

In addition, a scanning order may be determined according to flag or index information indicating at least one of DCT transform and DST transform. In addition, a scanning order may be determined according to flag or index information indicating whether or not at least one of DCT transform and DST transform is used. Alternatively, a scanning order may be determined on the basis of whether or not DCT or DST transform is performed as primary transform.

Meanwhile, when DST transform is performed for a transform block as primary transform, a scanning order may be determined according to a form in which residual signals are rearranged. Herein, the form in which the residual signals are rearranged may refer to a form where residual signals are not flipped, a form where residual signals are flipped in a horizontal direction, a form where residual signals are flipped in a vertical direction, a form where residual signals are flipped in horizontal and vertical directions, etc.

In one embodiment, when residual signals are not flipped, transform coefficient groups or individual coefficients may be scanned according to any one of up-right diagonal scanning and down-left diagonal scanning.

In another embodiment, in case of a form where residual signals are flipped in a horizontal direction, transform coefficient groups or individual coefficients may be scanned according to up-right diagonal scanning.

In another embodiment, in case of a form where residual signals are flipped in a vertical direction, transform coefficient groups or individual coefficients may be scanned according to down-left diagonal scanning.

In another embodiment, in case of a form where residual signals are flipped in horizontal and vertical directions, transform coefficient groups or individual coefficients may be scanned according to any one of up-right diagonal scanning and down-left diagonal scanning.

In another embodiment, when DST transform is performed for a transform block as primary transform, transform coefficient groups or individual coefficients may be scanned according to any one of up-right diagonal scanning and down-left diagonal scanning.

In another embodiment, when DST transform is not performed for a transform block as primary transform, transform coefficient groups or individual coefficients may be scanned according to any one of up-right diagonal scanning and down-left diagonal scanning.

In addition, a scanning order may be determined on the basis of whether or not DST transform is performed as primary transform.

Meanwhile, when transform is performed by using rotational transform as secondary transform, a scanning order may be determined according to a rotational angle. In addition, a scanning order may be determined according to index information indicating the rotational angle.

In one embodiment, when a rotational angle is 0 degrees, any one of vertical scanning, first vertical precedence scanning, and second vertical precedence scanning may be used for a coefficient group unit or an individual coefficient unit. In addition, when a rotational angle is 90 degrees, any one of horizontal scanning, first horizontal precedence scanning, and second horizontal precedence scanning may be used for a coefficient group unit or an individual coefficient unit. In addition, when a rotational angle is 180 degrees, any one vertical scanning, first vertical precedence scanning, and second vertical precedence scanning may be used for a coefficient group unit or an individual coefficient unit. In addition, when a rotational angle is 270 degrees, any one of horizontal scanning, first horizontal precedence scanning, and second horizontal precedence scanning may be used for a coefficient group unit or an individual coefficient unit.

In another embodiment, when a rotational angle is 0 degrees, any one of horizontal scanning, first horizontal precedence scanning, and second horizontal precedence scanning may be used for a coefficient group unit or an individual coefficient unit. In addition, when a rotational angle is 90 degrees, any one of vertical scanning, first vertical precedence scanning, and second vertical precedence scanning may be used for a coefficient group unit or an individual coefficient unit. In addition, when a rotational angle is 180 degrees, any one of horizontal scanning, first horizontal precedence scanning, and second horizontal precedence scanning may be used for a coefficient group unit or an individual coefficient unit. In addition, when a rotational angle is 270 degrees, any one of vertical scanning, first vertical precedence scanning, and second vertical precedence scanning may be used for a coefficient group unit or an individual coefficient unit.

In one embodiment, when transform is performed by using rotational transform as secondary transform, scanning may be performed according to at least one of up-right diagonal scanning and down-left diagonal scanning.

In another embodiment, when secondary transform is performed, scanning may be performed according to at least one of up-right diagonal scanning and down-left diagonal scanning.

In another embodiment, when DCT transform or DST transform is performed as primary transform, and secondary transform is performed, scanning may be performed according to at least one of up-right diagonal scanning and down-left diagonal scanning.

Alternatively, a scanning order may be determined on the basis of whether or not secondary transform is performed, whether or not rotational transform is performed as secondary transform, and whether or not secondary transform is performed after primary transform.

Meanwhile, when transform is performed by using Givens transform or hyper-Givens transform as secondary transform, a scanning order may be determined according to a rotational angle θ (theta). In addition, a scanning order may be determined according to index information indicating the rotational angle. Herein, a Givens transform or hyper-Givens transform matrix G(m, n, θ) may be defined on the basis of a representative definition shown in Formula 2 below.

$$G_{i,j}(m, n) = \begin{cases} \cos\theta, & i = j = m \text{ or } i = j = n, \\ \sin\theta, & i = m, j = n, \\ -\sin\theta, & i = n, j = m, \\ 1, & i = j \text{ and } i \neq m \text{ and } i \neq n, \\ 0, & \text{otherwise.} \end{cases}$$ [Formula 2]

In one embodiment, when a rotational angle θ (theta) is 0 degrees, any one of vertical scanning, first vertical precedence scanning, and second vertical precedence scanning may be used for a coefficient group unit or an individual coefficient unit. In addition, when a rotational angle θ (theta) is 90 degrees, any one of horizontal scanning, first horizontal precedence scanning, and second horizontal precedence scanning may be used for a coefficient group unit or an individual coefficient unit. In addition, when a rotational angle θ (theta) is 180 degrees, any one of vertical scanning, first vertical precedence scanning, and second vertical precedence scanning may be used for a coefficient group unit or an individual coefficient unit. In addition, when a rotational angle θ (theta) is 270 degrees, any one of horizontal scanning, first horizontal precedence scanning, and second horizontal precedence scanning may be used for a coefficient group unit or an individual coefficient unit.

In another embodiment, when a rotational angle θ (theta) is 0 degrees, any one of horizontal scanning, first horizontal precedence scanning, and second horizontal precedence scanning may be used for a coefficient group unit or an individual coefficient unit. In addition, when a rotational angle θ (theta) is 90 degrees, any one of vertical scanning, first vertical precedence scanning, and second vertical precedence scanning may be used for a coefficient group unit or an individual coefficient unit. In addition, when a rotational angle θ (theta) is 180 degrees, any one of horizontal scanning, first horizontal precedence scanning, and second horizontal precedence scanning may be used for a coefficient group unit or an individual coefficient unit. In addition, when a rotational angle θ (theta) is 270 degrees, any one of vertical scanning, first vertical precedence scanning, and second vertical precedence scanning may be used for a coefficient group unit or an individual coefficient unit.

In another embodiment, when transform is performed by using Givens transform or hyper-Givens transform as secondary transform, scanning may be performed according to any one of up-right diagonal scanning and down-left diagonal scanning.

Alternatively, a scanning order may be determined on the basis of whether or not Givens transform or hyper-Givens transform is performed as secondary transform.

A current block may include at least one of a transform skipped region (for which quantization is performed without performing transform), a primary transform performed region, and a primary and secondary transform performed region. Herein, scanning may be performed in a predetermined scanning order according to each region. When secondary transform is additionally performed for a partial region of a result obtained by performing primary transform for the current block, transform coefficients may be scanned by dividing the same into regions according to whether or not transform is performed for each coefficient. Herein, scanning may be performed for all or a part of transform coefficients within the current block.

In one embodiment, when a current block is a block or region for which transform is skipped, transform coefficient groups or individual coefficients may be scanned according to any one of an up-right diagonal scanning order and a down-left diagonal scanning order. In addition, when a current block is not a block or region for which transform is skipped, transform coefficient groups or individual coefficients may be scanned according to any one of a horizontal scanning order, a first horizontal precedence scanning order, a second horizontal precedence scanning order, a vertical scanning order, a first vertical precedence scanning order, and a second vertical precedence scanning order.

In another embodiment, when a current block is a block or region for which transform is skipped, transform coefficient groups or individual coefficients may be scanned according any one of a horizontal scanning order, a first horizontal precedence scanning order, a second horizontal precedence scanning order, a vertical scanning order, a first vertical precedence scanning order, and a second vertical precedence scanning order. In addition, when a current block is not a block or region for which transform is skipped, transform coefficient groups or individual coefficients may be scanned according to any one of an up-right diagonal scanning order and a down-left diagonal scanning order. Meanwhile, a scanning order determined on the basis whether or not a current block is a block for which transform is skipped is not limited to the above example, and may be determined as an arbitrary scanning order selected among various scanning orders according to the present disclosure.

Figure 15:
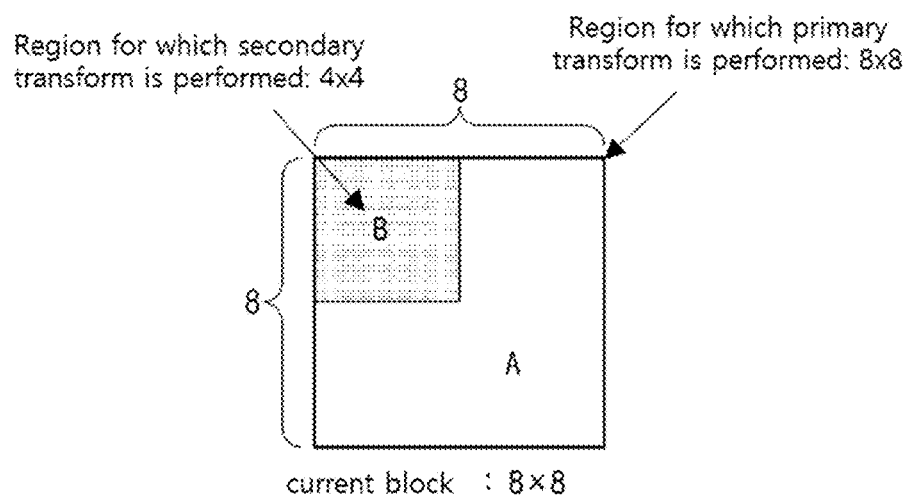
FIGS. 15 to 18 are views showing an example of determining a scanning order on the basis of a region for which transform is performed.

FIG. 15 is a view showing a case where secondary transform is performed for a partial region (for example, up-left 4×4 region (gray color region)) after performing primary transform for a current block of 8×8. Herein, transform coefficients may be scanned by dividing the same into a region A for which only primary transform is performed and a region B for which primary transform and secondary transform are performed. A coefficient group unit having the same or different sizes may be used for the region A and the regions B, or the same or different scanning orders may be used between regions.

In one embodiment, scanning in a 4×4 coefficient group unit may be identically used for the region A and the region B, and scanning in an up-right diagonal scanning order or a down-left diagonal scanning order may be used for both regions.

In another embodiment, scanning in a 4×4 coefficient group unit may be used for the region A, scanning in a 2×2 coefficient group unit may be used for the region B, a vertical scanning order or a horizontal scanning order may be used for coefficient units within the region A, and an up-right diagonal scanning order or a down-left diagonal scanning order may be used for coefficient units within the region B.

In another embodiment, scanning in a 4×4 coefficient group unit may be used for the region A, scanning in a 2×2 coefficient group unit may be used for the region B, and an up-right diagonal scanning order or a down-left diagonal scanning order may be used for both regions.

Figure 16:
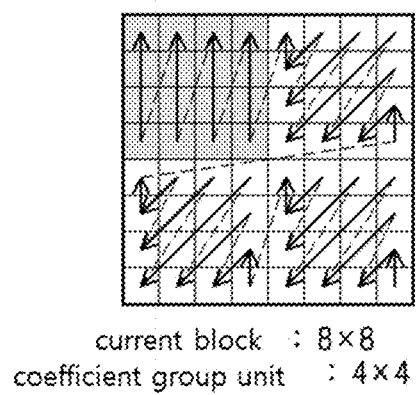

In another embodiment, as shown in FIG. 16, scanning in a 4×4 coefficient group unit may be identically used for a region A and a region B, an up-right diagonal scanning order or a down-left diagonal scanning order may be used for coefficient group units within the region A, and a vertical scanning order may be used for the region B.

Figure 17:
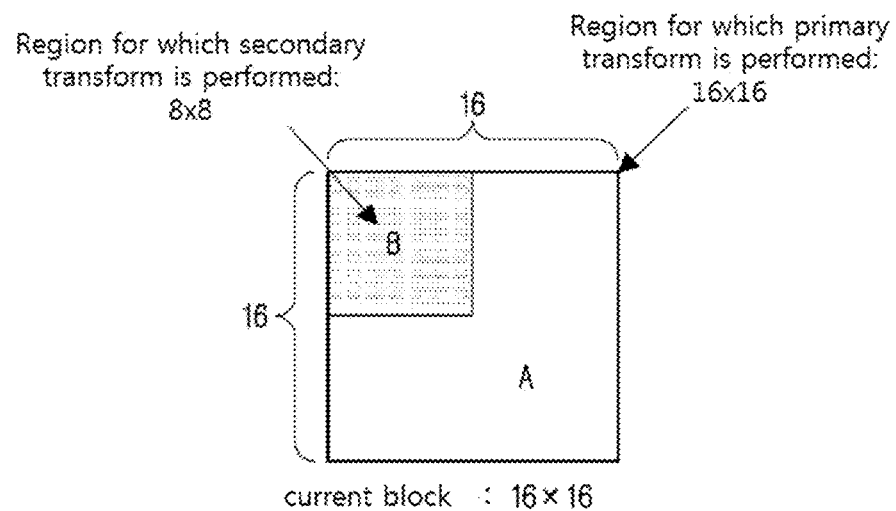

FIG. 17 is a view showing a case where secondary transform is perform for a partial region (for example, up-left 8×8 region (gray color region)) after performing primary transform for a current block of 16×16. Herein, transform coefficients may be scanned by dividing the same into a region A for which only primary transform is performed and a region B for which primary transform and secondary transform are performed. A coefficient group unit having the same or difference sizes may be used for the region A and the region B, and the same or different scanning orders may be used between regions.

In one embodiment, scanning in a 4×4 coefficient group unit may be identically used for the region A and the region B, and an up-right diagonal scanning order or a down-left diagonal scanning order may be used for both regions.

In another embodiment, scanning in an 8×8 coefficient group unit may be used for the region A, scanning in a 4×4 coefficient group unit may be used for the region B, vertical scanning order or horizontal scanning order may be used for coefficient units within the region A, and an up-right diagonal scanning or down-left diagonal scanning order may be used for coefficient units within the region B.

In another embodiment, scanning in an 8×8 coefficient group unit may be identically used for the region A and the region B, and an up-right diagonal scanning or a down-left diagonal scanning order may be used for both regions.

Figure 18:
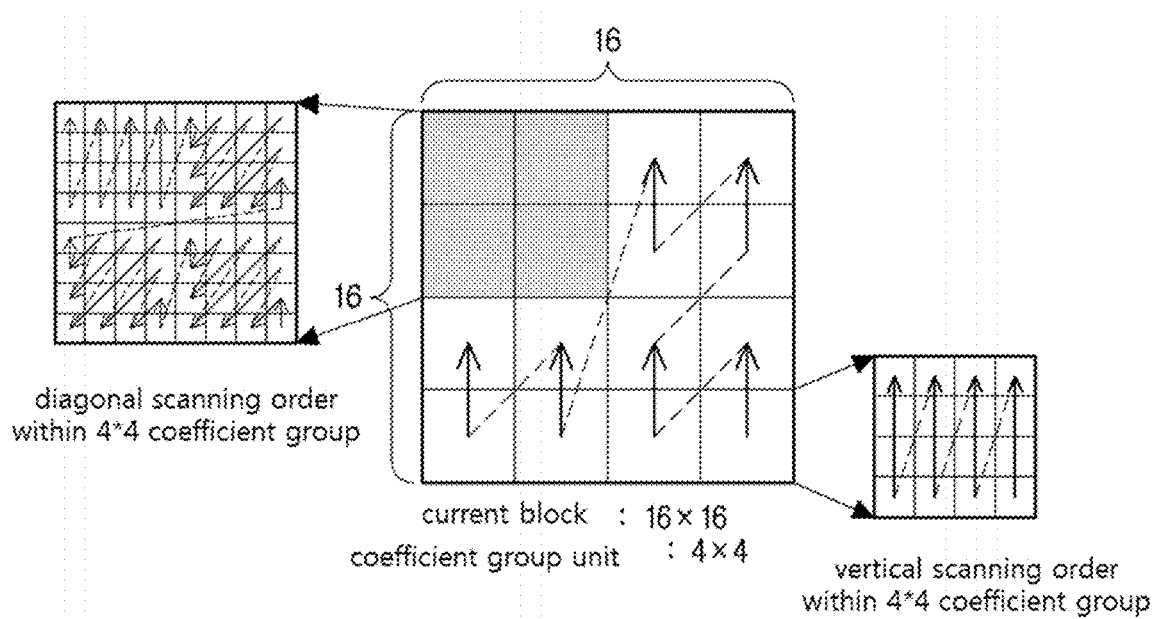

In another embodiment, as shown in FIG. 18, scanning in a 4×4 coefficient group unit may be identically used for a region A and a region B, a vertical scanning order may be used for coefficient group units within the region A, and an up-right diagonal scanning order may be used for the region B.

In another embodiment, scanning in 4×4 and 8×8 coefficient group units may be respectively used for the region A and the region B, a vertical scanning order may be used for coefficient units within the region A, and an up-right diagonal scanning order may be used for the region B.

Meanwhile, a scanning order of a region for which only primary transform is performed may be determined on the basis of an intra-prediction mode of a current block and a size of the current block.

In addition, a scanning order of a region for which primary transform and secondary transform are performed may be determined on the basis of a form of a current block, or a predefined scanning order may be applied. Herein, the predefined scanning order may be a scanning order commonly set in the encoder/decoder. Meanwhile, information of a scanning order predefined for a region for which primary transform and secondary transform are performed may be signaled from the encoder to the decoder.

Meanwhile, at least one scanning order described above may be preset or stored in the encoder/decoder as a scanning order for a specific block size. Herein, when determining a scanning order for a block smaller than the specific block size, the same may be derived by performing subsampling or upsampling a scanning order for the block size.

In one embodiment, when an up-right scanning order is stored for a 32×32 block size in the encoder/decoder, in order to derive a scanning order for a block of a 16×16 block size, the scanning order for the 16×16 block size may be derived by extracting (or subsampling) scanning order values of positions corresponding to an up-right scanning order of 16×16 size from the up-right scanning order of 32×32 block size.

In another embodiment, when a down-left scanning order is stored for an 8×8 block size in the encoder/decoder, in order to derive a scanning order for a block of a 16×16 block size, the scanning order for the 16×16 block size may be derived by upsampling (or interpolating) scanning order values of positions corresponding to an up-right scanning order of a 16×16 size from the down-left scanning order of 8×8 size.

Meanwhile, when a current block has a non-square form, coefficient groups within the current block may be rearranged in a square form, and entropy encoding/decoding may be performed by scanning transform coefficients within the rearranged coefficient groups. Herein, at least one of embodiments for the scanning order of the present invention may be used as a rearranging method.

For example, when a current block has a non-square form of a 32×8 size, coefficient groups may be rearranged in a block having a square form of a 16×16 size by using at least one scanning order among scanning orders between the coefficient groups, and transform coefficients within the rearranged coefficient groups may be scanned.

A scanning order of a chroma signal may be determined as the same as a scanning order used in a luma signal. Herein, at least one of embodiments of a scanning order of the present invention may be used for the scanning order of the chroma signal. Alternatively, a scanning order of a chroma signal may be predefined in association with a scanning order of a luma signal.

In one embodiment, the encoder/decoder may derive a scanning order of a chroma signal from a scanning order of a luma signal by referencing a predefined look-up-table. Alternatively, a scanning order of a chroma signal may be determined by using at least one of various methods according to the present invention which determines a scanning order of a luma signal.

Meanwhile, when values of transform coefficients are represented in a bit plane form, entropy encoding/decoding may be performed for each bit plane by scanning by using at least one of embodiments of a scanning order of the present invention.

Meanwhile, secondary transform may be performed by using least one scanning order among embodiments of a scanning order of the present invention. In other words, secondary transform may be replaced with performing scanning for transform coefficients generated after primary transform. By replacing secondary transform with scanning, encoding efficiency may be improved by rearranging transform coefficients.

Figure 19:
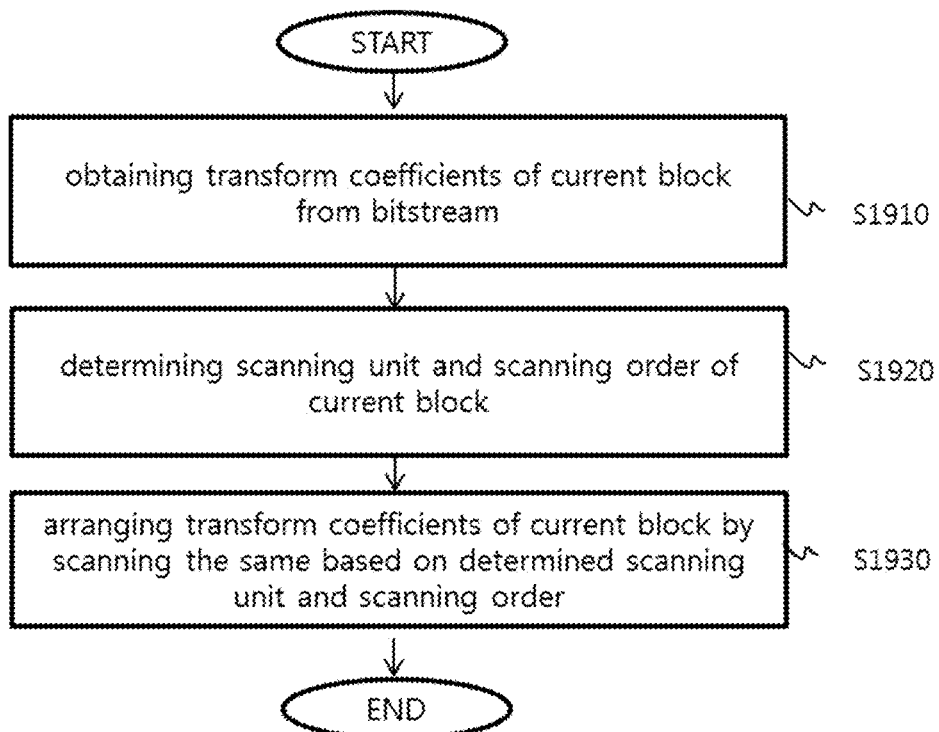
FIG. 19 is a view of a flowchart showing an image decoding method according to an embodiment of the present invention.

FIG. 19 is a view of a flowchart showing an image decoding method according to an embodiment of the present invention.

Referring to FIG. 19, in step S1910, the decoder may obtain transform coefficients of a current block from a bitstream.

Subsequently, in step S1920, the decoder may determine a scanning unit and a scanning order of the current block.

Herein, transform coefficients of the current block may be any one of an input of dequantization, an input of secondary inverse transform, and an input of primary inverse transform.

Meanwhile, the scanning order may include at least one of a vertical scanning order, a horizontal scanning order, a first vertical precedence scanning order preferentially scanning a first column than other columns, a second vertical precedence scanning order preferentially scanning a first column and a second column than other columns, a first horizontal precedence scanning order preferentially scanning a first row than other rows, a second horizontal precedence scanning order preferentially scanning a first row and a second row than other rows, an up-right diagonal scan order, and a down-left diagonal scanning order.

Meanwhile, the scanning unit may be determined as any one of a coefficient group unit, an individual coefficient unit, and a combination unit.

Meanwhile, in step S1920 of determining the scanning unit and the scanning order of the current block, the scanning unit and the scanning order of the current block may be determined on the basis of at least one a scanning unit and a scanning order of a neighbor block of the current block.

Meanwhile, when the scanning unit of the current block is determined as a coefficient group unit, a transform coefficient scanning order within the coefficient group unit may be determined on the basis of a scanning order of a neighbor coefficient group adjacent to the current coefficient group.

Meanwhile, the scanning order of the current block may be determined on the basis of a depth of the current block.

Meanwhile, a scanning unit and a scanning order of a chroma component of the current block may be determined on the basis of a scanning unit and a scanning order of a luma component of the current block.

Meanwhile, a scanning order of a quantization matrix of the current block may be derived on the basis of the determined scanning order.

In addition, in step S1930, the decoder may arrange the transform coefficients of the current block by scanning the same on the basis of the determined scanning unit and scanning order.

In addition, the decoder may perform at least one of dequantization, secondary inverse transform, and primary inverse transform for the arranged transform coefficients.

Figure 20:
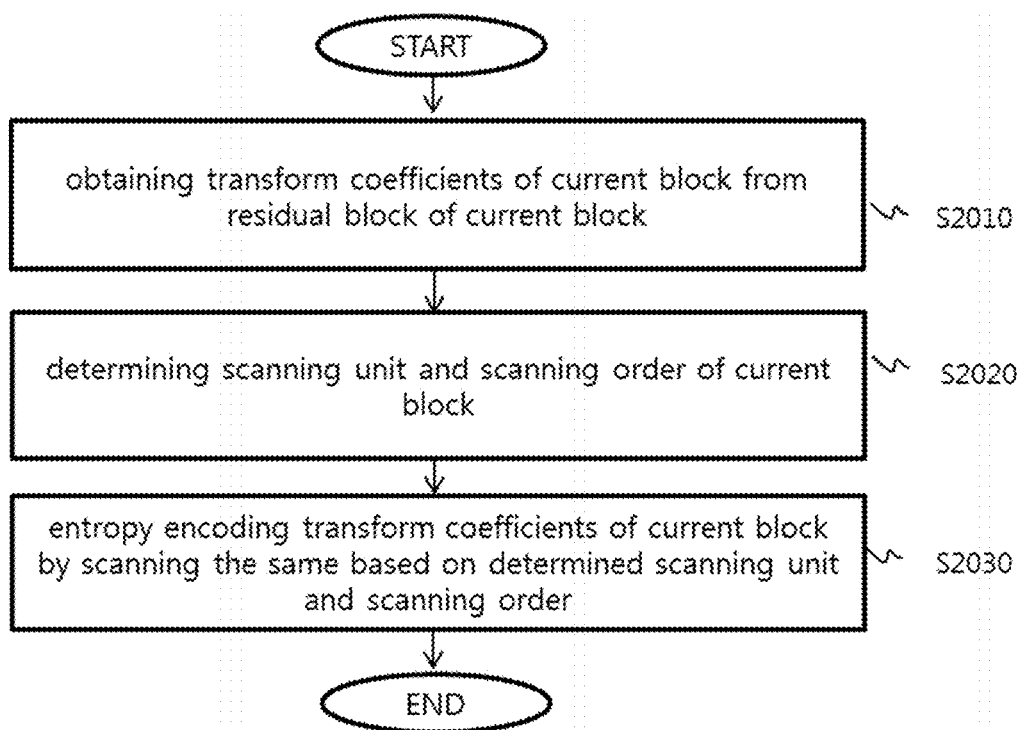
FIG. 20 is a view of a flowchart showing an image encoding method according to an embodiment of the present invention.

FIG. 20 is a view of a flowchart showing an image encoding method according to an embodiment of the present invention.

Referring to FIG. 20, in step S2010, the encoder may obtain transform coefficients of a current block from a residual block of the current block.

Subsequently, in step S2020, the encoder may determine a scanning unit and a scanning order of the current block.

Herein, transform coefficients of the current block may be any one of an output of primary transform, an output of secondary transform, and an output of quantization.

Meanwhile, the scanning order may include at least one of a vertical scanning order, a horizontal scanning order, a first vertical precedence scanning order preferentially scanning a first column than other columns, a second vertical precedence scanning order preferentially scanning a first column and a second column than other columns, a first horizontal precedence scanning order preferentially scanning a first row than other rows, a second horizontal precedence scanning order preferentially scanning a first row and a second row than other rows, an up-right diagonal scanning order, and a down-left diagonal scanning order.

Meanwhile, the scanning unit may be determined as any one of a coefficient group unit, an individual coefficient unit, and a combination unit.

Meanwhile, in step S2020 of determining the scanning unit and the scanning order of the current block, the scanning unit and the scanning order of the current block may be determined on the basis of at least one of a scanning unit and a scanning order of a neighbor block of the current block.

Meanwhile, when the scanning unit of the current block is determined as a coefficient group unit, a transform coefficient scanning order within the coefficient group unit may be determined on the basis of a scanning order of a neighbor coefficient group adjacent to the current coefficient group.

Meanwhile, the scanning order of the current block may be determined on the basis of a depth of the current block.

Meanwhile, a scanning unit and a scanning order of a chroma component of the current block may be determined on the basis of a scanning unit and a scanning order of a luma component of the current block.

Meanwhile, a scanning order of a quantization matrix of the current block may be derived on the basis of the determined scanning order.

Subsequently, in step S2030, the encoder may entropy encode the transform coefficients of the current block by scanning the same on the basis of the determined scanning unit and scanning order.

The above embodiments may be performed in the encoder and the decoder in the same method.

An order of applying the above embodiment may differ between the encoder and the decoder, or an order of applying the above embodiment may be identical in the encoder and the decoder.

The above embodiment may be respectively performed for luma and chroma signals, or may be identically performed for luma and chroma signals.

A block form to which the embodiments of the present invention are applied may have a square form or non-square form.

The embodiments of the present invention may be applied to according to a size of at least one of an coding block, a prediction block, a transform block, a block, a current block, a coding unit, a prediction unit, a transform unit, a unit, and a current unit. Herein, the size may be defined as minimum or maximum or both sizes where the embodiments can be applied, or may be defined to be a fixed size where the embodiment is applied. In addition, in the embodiments, a first embodiment may be applied for a first size, and a second embodiment may be applied for a second size. In other words, the embodiments may be applied in a composite manner according to a size. In addition, the embodiments of the present invention may be applied to a size equal to or greater than a minimum size and equal to or smaller than a maximum size. In other words, the embodiments may be applied when a block size is included in a predetermined range.

For example, the embodiments may be applied to a current block having a size equal to or greater than 8×8. For example, the embodiments may be applied to a current block having a size equal to or greater than 4×4. For example, the embodiments may be applied to a current block having a size equal to or smaller than 16×16. For example, the embodiments may be applied to a current block having a size equal to or greater than 16×16 and equal to or smaller than 64×64.

The embodiments of the present invention may be applied according to a temporal layer. In order to identify a temporal layer for which the embodiments can be applied, an additional identifier may be signaled, and the embodiments may be applied to a temporal layer specified by the corresponding identifier. Herein, the identifier may be defined as a lowest layer or a highest layer or both for which the embodiments can be applied, or may be defined to indicate a specific layer for which the embodiments is applied. In addition, a fixed temporal layer for which the embodiment is applied may be defined.

For example, the embodiments may be applied when a temporal layer of a current image is the lowest layer. For example, the embodiments may be applied when a temporal layer identifier of a current image is equal to or greater than 1. For example, the embodiments may be applied when a temporal layer of a current image is the highest layer.

A slice type for which the embodiments of the preset invention are applied may be defined, and the embodiments of the preset invention may be applied according to a corresponding slice type.

At least one of a flag and an index which is entropy encoded in the encoder and entropy decoded in the decoder may use at least one of binarization methods below.

Truncated rice binarization method
K-th order exp_golomb binarization method
Restricted K-th order exp_golomb binarization method
Fixed-length binarization method
Unary binarization method
Truncated unary binarization method It is possible to apply at least one combination of the specific embodiment or the embodiments to the encoding/decoding process of the current block without being applied to the encoding/decoding process of the current block as being limited to only one of the embodiments.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used for an image encoding/decoding apparatus.

The invention claimed is:

1. A method of decoding an image, the method comprising:
   obtaining transform coefficients for a current block; and
   performing decoding for the current block based on the transform coefficients, wherein:
      the current block is not a transform skip block,
      a scanning unit of a current block is determined based on a size of the current block,
      the transform coefficients are obtained according to a scanning order,
      the transform coefficients are arranged by scanning the transform coefficients based on the scanning unit,
      a specific diagonal scan mode is used for the scanning as the current block is not classified as a transform skip block,
      the scanning unit is a coefficient group unit,
      a size of the coefficient group unit is a first predetermined size representing a square shape in a case that the size of the current block is a second predetermined size representing a non-square shape,
      the number of columns of a plurality of coefficient group units in the current block is greater than 1 in a case that the size of the current block is the second predetermined size representing a non-square shape, and
      the number of rows of the plurality of coefficient group units in the current block is greater than 1 in a case that the size of the current block is the second predetermined size representing a non-square shape.

2. The method of claim 1, wherein the transform coefficients is an input of dequantization.

3. The method of claim 1,
   wherein scanning for a second transform coefficient is performed following scanning for a first transform coefficient according to the specific diagonal scan order,
   wherein an x-coordinate of the second transform coefficient is smaller by 1 than an x-coordinate of the first transform coefficient, and
   wherein a y-coordinate of the second transform coefficient is greater by 1 than a y-coordinate of the first transform coefficient.

4. The method of claim 1, wherein the specific diagonal scan mode uses a down-left diagonal scanning order.

5. The method of claim 1, wherein the scanning is performed according to a diagonal scanning order of the specific diagonal scan mode, and
   wherein a direction of the diagonal scanning order is determined based on whether the current block is a transform skip block or not.

6. A method of encoding an image, the method comprising:
   obtaining transform coefficients for a current block; and
   performing encoding for the current block based on the transform coefficients, wherein:
      the current block is not a transform skip block,
      a scanning unit of a current block is determined based on a size of the current block,
      the transform coefficients are obtained according to a scanning order,
      the transform coefficients are arranged by scanning the transform coefficients based on the scanning unit,
      a specific diagonal scan mode is used for the scanning as the current block is not classified as a transform skip block,
      the scanning unit is a coefficient group unit,
      a size of the coefficient group unit is a first predetermined size representing a square shape in a case that the size of the current block is a second predetermined size representing a non-square shape,
      the number of columns of a plurality of coefficient group units in the current block is greater than 1 in a case that the size of the current block is the second predetermined size representing a non-square shape, and
      the number of rows of the plurality of coefficient group units in the current block is greater than 1 in a case that the size of the current block is the second predetermined size representing a non-square shape.

7. The method of claim 6, wherein:
   scanning for a second transform coefficient is performed following scanning for a first transform coefficient according to the specific diagonal scan order,
   an x-coordinate of the second transform coefficient is smaller by 1 than an x-coordinate of the first transform coefficient, and
   a y-coordinate of the second transform coefficient is greater by 1 than a y-coordinate of the first transform coefficient.

8. The method of claim 6, wherein the specific diagonal scan mode uses a down-left diagonal scanning order.

9. A method of storing a bitstream in a non-transitory computer-readable recording medium, the method comprising:
   obtaining transform coefficients for a current block;
   performing encoding for the current block based on the transform coefficients to generate encoded information; and storing the bitstream comprising the encoded information in the non-transitory computer-readable recording medium, wherein the current block is not a transform skip block, a scanning unit of a current block is determined based on a size of the current block, the transform coefficients are obtained according to a scanning order, the transform coefficients are arranged by scanning the transform coefficients based on the scanning unit, a specific diagonal scan mode is used for the scanning as the current block is not classified as a transform skip block, the scanning unit is a coefficient group unit, a size of the coefficient group unit is a first predetermined size representing a square shape in a case that the size of the current block is a second predetermined size representing a non-square shape, wherein the number of columns of a plurality of coefficient group units in the current block is greater than 1 in a case that the size of the current block is the second predetermined size representing a non-square shape, and wherein the number of rows of the plurality of coefficient group units in the current block is greater than 1 in a case that the size of the current block is the second predetermined size representing a non-square shape.

10. The method of claim 9, wherein:

scanning for a second transform coefficient is performed following scanning for a first transform coefficient according to the specific diagonal scan order, an x-coordinate of the second transform coefficient is smaller by 1 than an x-coordinate of the first transform coefficient, and a y-coordinate of the second transform coefficient is greater by 1 than a y-coordinate of the first transform coefficient.

11. The method of claim 9, wherein the specific diagonal scan mode uses a down-left diagonal scanning order.

12. A method for sending a bitstream, the method comprising:

sending the bitstream to a video decoding apparatus to make the video decoding apparatus perform decoding for the current block, wherein transform coefficients for a current block are obtained, wherein the decoding for the current block is performed based on the transform coefficients, wherein the current block is not a transform skip block, wherein a scanning unit of a current block is determined based on a size of the current block, wherein the transform coefficients are obtained according to a scanning order, wherein the transform coefficients are arranged by scanning the transform coefficients based on the scanning unit, wherein a specific diagonal scan mode is used for the scanning as the current block is not classified as a transform skip block, the scanning unit is a coefficient group unit, wherein a size of the coefficient group unit is a first predetermined size representing a square shape in a case that the size of the current block is a second predetermined size representing a non-square shape, wherein the number of columns of a plurality of coefficient group units in the current block is greater than 1 in a case that the size of the current block is the second predetermined size representing a non-square shape, and wherein the number of rows of the plurality of coefficient group units in the current block is greater than 1 in a case that the size of the current block is the second predetermined size representing a non-square shape.

13. The method of claim 12, wherein:

scanning for a second transform coefficient is performed following scanning for a first transform coefficient according to the specific diagonal scan order, an x-coordinate of the second transform coefficient is smaller by 1 than an x-coordinate of the first transform coefficient, and a y-coordinate of the second transform coefficient is greater by 1 than a y-coordinate of the first transform coefficient.

14. The method of claim 12, wherein the specific diagonal scan mode uses a down-left diagonal scanning order.

* * * * *